US012608800B2

(12) United States Patent
Sugahara

(10) Patent No.: US 12,608,800 B2
(45) Date of Patent: Apr. 21, 2026

(54) LEARNING DEVICE, LEARNING METHOD, OPERATION PROGRAM OF LEARNING DEVICE, TEACHER DATA GENERATION DEVICE, MACHINE LEARNING MODEL, AND MEDICAL IMAGING APPARATUS

(71) Applicant: FUJIFILM CORPORATION, Tokyo (JP)

(72) Inventor: Masataka Sugahara, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 390 days.

(21) Appl. No.: 18/360,817

(22) Filed: Jul. 28, 2023

(65) Prior Publication Data

US 2023/0368384 A1 Nov. 16, 2023

Related U.S. Application Data

(63) Continuation of application No. PCT/JP2022/005744, filed on Feb. 14, 2022.

(30) Foreign Application Priority Data

Feb. 17, 2021 (JP) ................................. 2021-023759

(51) Int. Cl.
*G06T 7/00* (2017.01)

(52) U.S. Cl.
CPC .. *G06T 7/0012* (2013.01); *G06T 2207/10116* (2013.01); *G06T 2207/10132* (2013.01);
(Continued)

(58) Field of Classification Search
CPC ......... G06T 7/0012; G06T 2207/20081; G06T 2207/20084; G06T 2207/10132;
(Continued)

(56) References Cited

U.S. PATENT DOCUMENTS 11,185,302 B2 * 11/2021 Tsuchiya .............. A61B 6/0487
11,526,697 B1 * 12/2022 Tripathi .............. G06V 20/647
(Continued)

FOREIGN PATENT DOCUMENTS

CN 107194987 A 9/2017
CN 108876814 A 11/2018
(Continued)

OTHER PUBLICATIONS

Extended European Search Report dated Jul. 15, 2024, issued in corresponding EP Patent Application No. 22756131.3.
(Continued)

*Primary Examiner* — Utpal D Shah
*Assistant Examiner* — Jack Peter Kraynak
(74) *Attorney, Agent, or Firm* — SOLARIS Intellectual Property Group, PLLC

(57) ABSTRACT

Provided is a learning device that trains a machine learning model. The learning device includes a processor and a memory, in which the processor generates a plurality of pseudo images, which are pseudo images of a human body generated based on a human body model composed of three-dimensional computer graphics data and imitate an examination subject in a state of being positioned with respect to a medical imaging apparatus, for each combination of an imaging part and an imaging direction, and trains the machine learning model using a plurality of teacher data composed of the generated pseudo image and correct answer data of the combination.

13 Claims, 22 Drawing Sheets

(52) U.S. Cl.
CPC .............. *G06T 2207/20081* (2013.01); *G06T 2207/20084* (2013.01)

(58) Field of Classification Search
CPC ...... G06T 2207/10116; G06V 2201/03; G06V 10/774; G06V 40/00–70; G06N 3/0475
See application file for complete search history.

(56) References Cited

U.S. PATENT DOCUMENTS

| | | | |
|---|---|---|---|
| 2013/0121556 A1* | 5/2013 | Matsumoto | G06T 7/0012 |
| | | | 382/132 |
| 2015/0092993 A1* | 4/2015 | Kanda | A61B 1/000094 |
| | | | 382/106 |
| 2015/0213646 A1* | 7/2015 | Ma | G06T 7/50 |
| | | | 345/420 |
| 2016/0275353 A1* | 9/2016 | Wnuk | G16Z 99/00 |
| 2019/0046130 A1 | 2/2019 | Imamura et al. | |
| 2020/0126297 A1* | 4/2020 | Tian | G06T 7/0012 |
| 2020/0226752 A1 | 7/2020 | Lee et al. | |
| 2020/0360089 A1* | 11/2020 | Lee | G06N 20/00 |
| 2020/0375546 A1* | 12/2020 | Shoudy | A61B 6/04 |
| 2021/0106303 A1* | 4/2021 | Ishii | G06T 7/50 |
| 2021/0304402 A1* | 9/2021 | Morgas | G06N 20/00 |
| 2022/0022824 A1 | 1/2022 | Sugahara | |
| 2022/0151573 A1* | 5/2022 | Sugahara | A61B 6/5229 |
| 2022/0277835 A1* | 9/2022 | Senegas | A61B 6/5247 |

FOREIGN PATENT DOCUMENTS

| | | |
|---|---|---|
| CN | 109381208 A | 2/2019 |
| CN | 109978640 A | 7/2019 |
| CN | 112287857 A | 1/2021 |
| JP | 2013-102851 A | 5/2013 |
| JP | 2020-192440 A | 12/2020 |
| JP | 2020-199163 A | 12/2020 |
| WO | 2020/209256 A1 | 10/2020 |
| WO | 2020/250917 A1 | 12/2020 |
| WO | 2021/020112 A1 | 2/2021 |

OTHER PUBLICATIONS

International Search Report issued in International Application No. PCT/JP2022/005744 on Apr. 19, 2022.
Written Opinion of the ISA issued in International Application No. PCT/JP2022/005744 on Apr. 19, 2022.
English language translation of the following: Office action dated Nov. 11, 2025 from the JPO in a Japanese patent application No. 2023-500828 corresponding to the instant patent application.
English language translation of the following: Office action dated Nov. 1, 2025 from the SIPO in a Chinese patent application No. 202280013806.7 corresponding to the instant patent application. This office action translation is submitted now in order to supplement the understanding of the cited references which are being disclosed in the instant Information Disclosure Statement.

* cited by examiner

56

3DCG DATA

HUMAN BODY MODEL

Z

56A 57    57

57

Y

57

57

X          56B

MODELING PARAMETER (M-PARAMETER)
PHYSIQUE INFORMATION, GENDER, POSTURE INFORMATION,
SKIN COLOR, HAIR COLOR, HAIRSTYLE, OR CLOTHES
HEIGHT, WEIGHT, SITTING HEIGHT, INSEAM LENGTH, HEAD
CIRCUMFERENCE, NECK CIRCUMFERENCE, SHOULDER WIDTH, CHEST
CIRCUMFERENCE, WAIST CIRCUMFERENCE, HAND LENGTH, ·····

FIG. 11

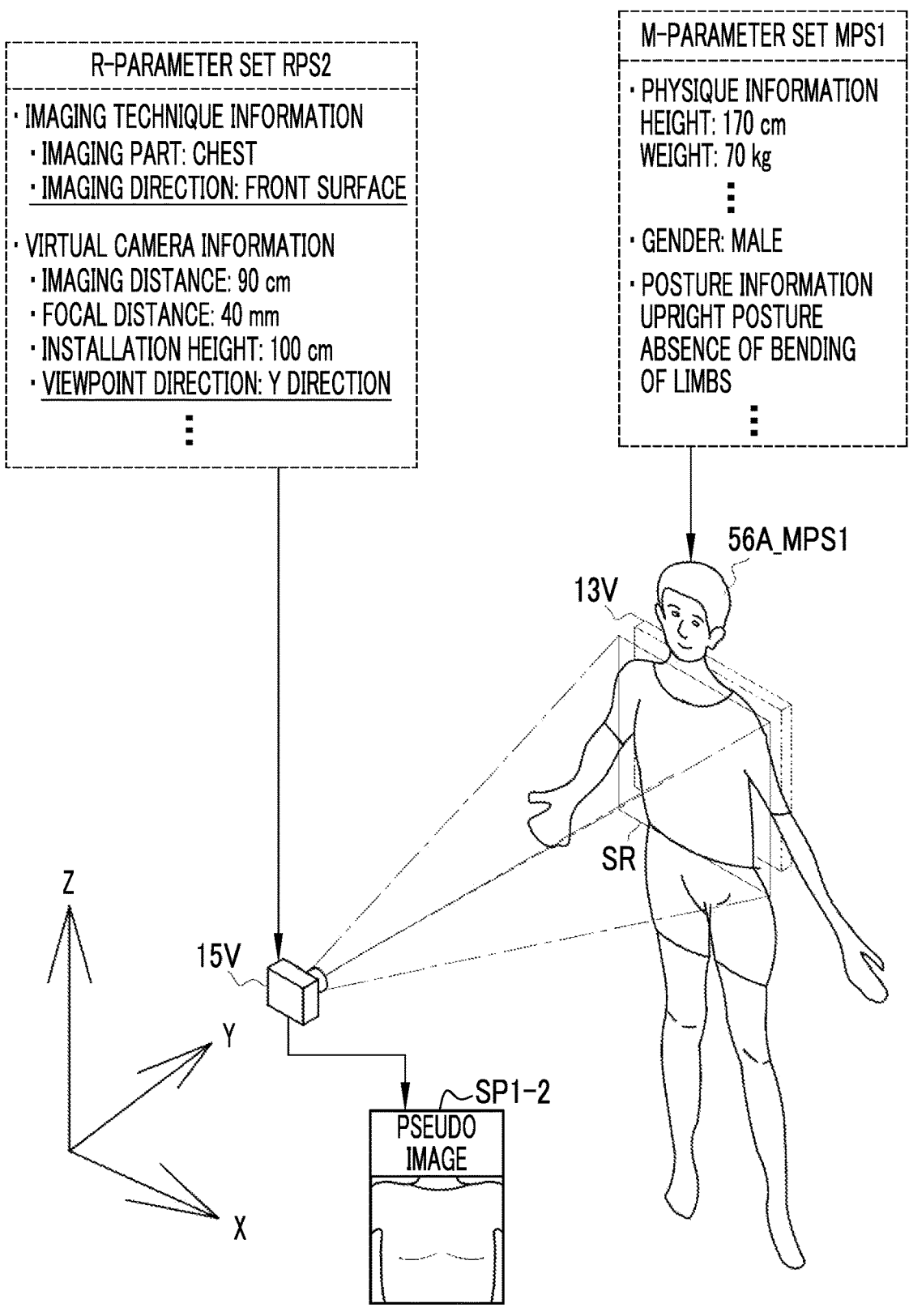

R-PARAMETER SET RPS2

· IMAGING TECHNIQUE INFORMATION
  · IMAGING PART: CHEST
  · IMAGING DIRECTION: FRONT SURFACE

· VIRTUAL CAMERA INFORMATION
  · IMAGING DISTANCE: 90 cm
  · FOCAL DISTANCE: 40 mm
  · INSTALLATION HEIGHT: 100 cm
  · VIEWPOINT DIRECTION: Y DIRECTION
  ⋮

M-PARAMETER SET MPS1

· PHYSIQUE INFORMATION
HEIGHT: 170 cm
WEIGHT: 70 kg
⋮

· GENDER: MALE

· POSTURE INFORMATION
UPRIGHT POSTURE
ABSENCE OF BENDING
OF LIMBS
⋮

56A_MPS1

13V

SR

15V

Z
Y
X

SP1-2
PSEUDO
IMAGE

FIG. 13

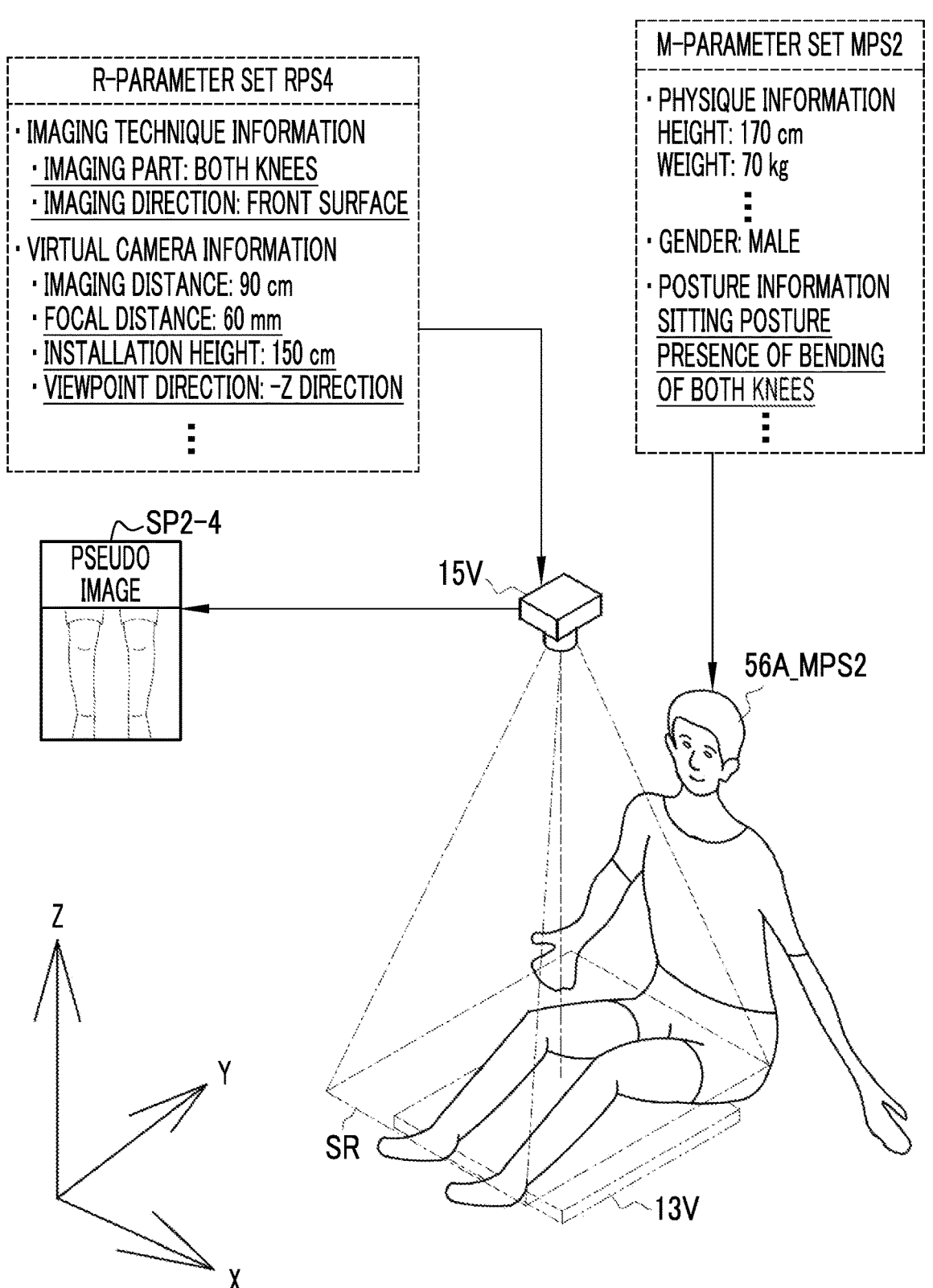

R-PARAMETER SET RPS4

· IMAGING TECHNIQUE INFORMATION
  · IMAGING PART: BOTH KNEES
  · IMAGING DIRECTION: FRONT SURFACE

· VIRTUAL CAMERA INFORMATION
  · IMAGING DISTANCE: 90 cm
  · FOCAL DISTANCE: 60 mm
  · INSTALLATION HEIGHT: 150 cm
  · VIEWPOINT DIRECTION: −Z DIRECTION

M-PARAMETER SET MPS2

· PHYSIQUE INFORMATION
  HEIGHT: 170 cm
  WEIGHT: 70 kg

· GENDER: MALE

· POSTURE INFORMATION
  SITTING POSTURE
  PRESENCE OF BENDING
  OF BOTH KNEES

SP2-4

PSEUDO
IMAGE

15V

56A_MPS2

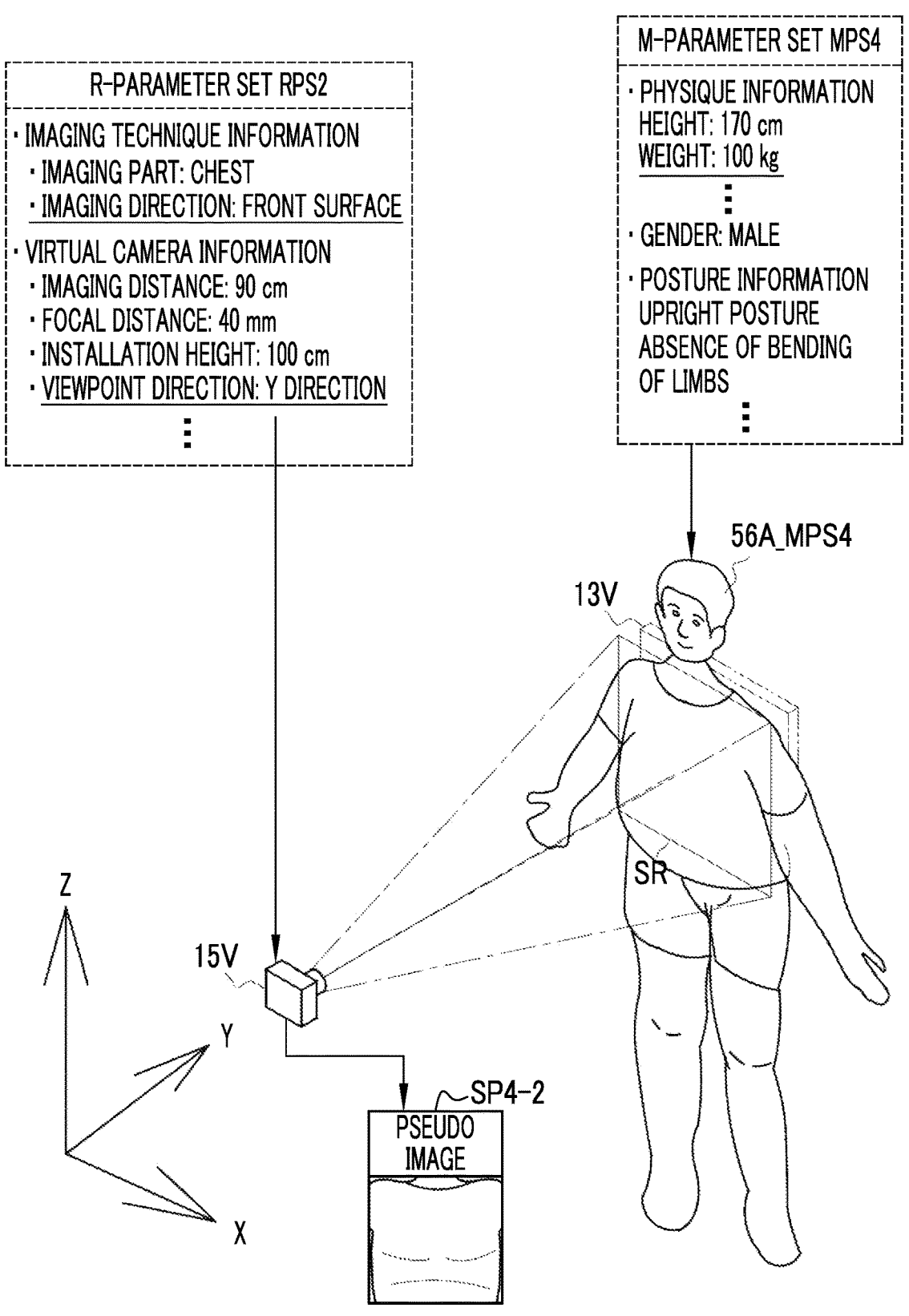

R-PARAMETER SET RPS2

· IMAGING TECHNIQUE INFORMATION
  · IMAGING PART: CHEST
  · IMAGING DIRECTION: FRONT SURFACE
· VIRTUAL CAMERA INFORMATION
  · IMAGING DISTANCE: 90 cm
  · FOCAL DISTANCE: 40 mm
  · INSTALLATION HEIGHT: 100 cm
  · VIEWPOINT DIRECTION: Y DIRECTION

M-PARAMETER SET MPS4

· PHYSIQUE INFORMATION
  HEIGHT: 170 cm
  WEIGHT: 100 kg

· GENDER: MALE

· POSTURE INFORMATION
  UPRIGHT POSTURE
  ABSENCE OF BENDING
  OF LIMBS

56A_MPS4

13V

Z

Y

X

15V

SR

~SP4-2

PSEUDO
IMAGE

FIG. 15

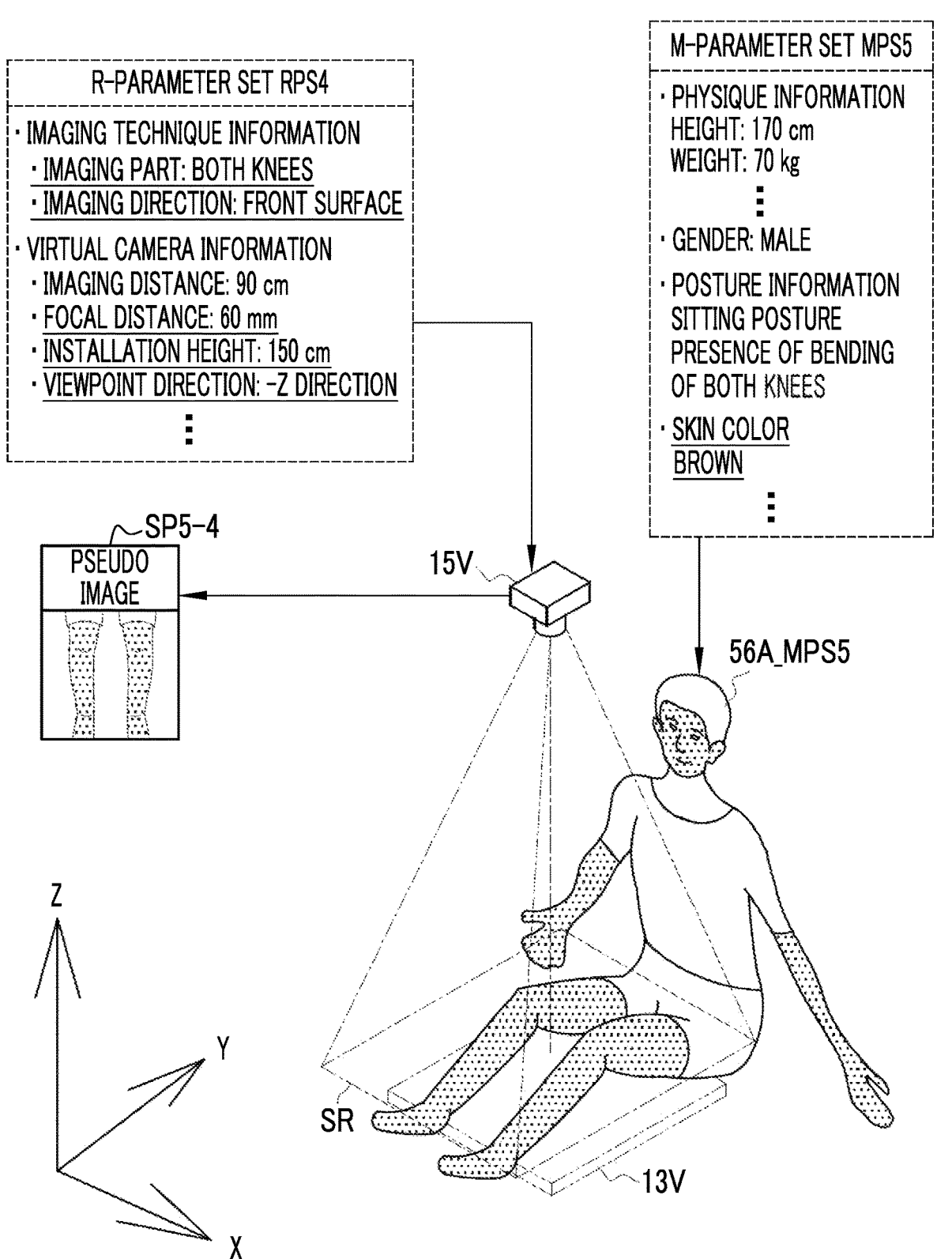

R-PARAMETER SET RPS4

· IMAGING TECHNIQUE INFORMATION
   · IMAGING PART: BOTH KNEES
   · IMAGING DIRECTION: FRONT SURFACE

· VIRTUAL CAMERA INFORMATION
   · IMAGING DISTANCE: 90 cm
   · FOCAL DISTANCE: 60 mm
   · INSTALLATION HEIGHT: 150 cm
   · VIEWPOINT DIRECTION: −Z DIRECTION

M-PARAMETER SET MPS5

· PHYSIQUE INFORMATION
   HEIGHT: 170 cm
   WEIGHT: 70 kg

· GENDER: MALE

· POSTURE INFORMATION
   SITTING POSTURE
   PRESENCE OF BENDING
   OF BOTH KNEES

· SKIN COLOR
   BROWN

SP5-4

PSEUDO IMAGE

15V

56A_MPS5

SR

13V

LEARNING DEVICE, LEARNING METHOD, OPERATION PROGRAM OF LEARNING DEVICE, TEACHER DATA GENERATION DEVICE, MACHINE LEARNING MODEL, AND MEDICAL IMAGING APPARATUS

CROSS-REFERENCE TO RELATED APPLICATION

This application is a continuation application of International Application No. PCT/JP2022/005744, filed on Feb. 14, 2022, the disclosure of which is incorporated herein by reference in its entirety. Further, this application claims priority from Japanese Patent Application No. 2021-023759, filed on Feb. 17, 2021, the disclosure of which is incorporated herein by reference in its entirety.

BACKGROUND

1. Technical Field

The technology of the present disclosure relates to a learning device, a learning method, an operation program of a learning device, a teacher data generation device, a machine learning model, and a medical imaging apparatus.

2. Description of the Related Art

As a medical imaging apparatus, for example, a radiography apparatus is known. In a case of radiography, a technician performs positioning to adjust a relative positional relationship between the radiography apparatus and an examination subject based on an imaging order acquired by a doctor who requests the imaging (for example, JP2020-192440A). In the imaging order, an imaging part, such as a chest or an abdomen, and an imaging direction, such as a front surface or a back surface, are defined. The technician performs positioning of the examination subject based on a content of the imaging order.

JP2020-192440A discloses the technology of performing assist in appropriate positioning by imaging, with an optical camera, the examination subject in a state of being positioned with respect to the radiography apparatus, and making the technician check a composite image in which the captured camera image and a mark indicating an appropriate positioning state are combined.

SUMMARY

It is studied to use the camera image as described above for checking whether or not the imaging part and the imaging direction of the examination subject conform to the content of the imaging order. Specifically, it is studied to cause a machine learning model to derive the imaging part and the imaging direction of the examination subject shown in the camera image using the camera image as input. According to this, it is possible to suppress an error, such as imaging an imaging part different from the imaging part designated in the imaging order. In a case of medical imaging, since the examination subject who is a subject is often incapable of physical freedom and has a heavy burden of re-imaging, there is a high need to suppress the re-imaging as compared with other uses. Therefore, in a case in which such a machine learning model is used for the medical imaging, a machine learning model having high recognition accuracy of the imaging part and the imaging direction of the examination subject shown in the camera image is desired.

In order to improve the recognition accuracy of the machine learning model, it is better as the number of teacher data composed of the camera image and correct answer data of a combination of the imaging part and the imaging direction is larger. In particular, as the camera images of the teacher data are more various for each combination of the imaging part and the imaging direction, the recognition accuracy of the machine learning model is improved. Even in the same combination of the imaging part and the imaging direction, there are various postures of the examination subject or appearance of the examination subject shown in the camera image. Even in a case in which the posture or the appearance of the examination subject is different, it is necessary to cause the machine learning model to recognize that the combination of the imaging part and the imaging direction is the same. For that purpose, as the camera image used for the teacher data, it is necessary to collect a large number of various camera images in which the posture and the appearance of the examination subject are different for each combination of the imaging part and the imaging direction.

However, since it takes a lot of time and effort to collect a large number of such camera images, there is a demand for a method of efficiently improving the recognition accuracy of the machine learning model.

The technology of the present disclosure provides a learning device, a learning method, an operation program of a learning device, a teacher data generation device, a machine learning model, and a medical imaging apparatus capable of efficiently training a machine learning model that derives an imaging part and an imaging direction of an examination subject shown in a camera image as compared with a case in which only the camera image is used as teacher data.

In order to achieve the above object, the present disclosure relates to a learning device that trains a machine learning model that uses, as input, a camera image obtained by imaging an examination subject in a state of being positioned with respect to a medical imaging apparatus with an optical camera, and derives an imaging part and an imaging direction of the examination subject shown in the camera image, the learning device comprising a processor, and a memory connected to or built in the processor, in which the processor generates a plurality of pseudo images, which are pseudo images of a human body generated based on a human body model composed of three-dimensional computer graphics data and imitate the examination subject in a state of being positioned with respect to the medical imaging apparatus, for each combination of the imaging part and the imaging direction, and trains the machine learning model using a plurality of teacher data composed of the generated pseudo image and correct answer data of the combination.

The three-dimensional computer graphics data may be attached with a modeling parameter for changing at least one of a posture or appearance of the human body model.

The modeling parameter may include at least one of physique information indicating a physique of the human body model, gender, posture information, a skin color, a hair color, a hairstyle, or clothes.

The processor may be able to generate the pseudo image by rendering the human body model from a set viewpoint, and the viewpoint may be changeable by a rendering parameter.

Viewpoint information for setting the viewpoint may include a focal length of a virtual camera, which is virtually installed at the viewpoint, and an imaging distance, which is a distance from the virtual camera to the human body model.

In a case in which the teacher data composed of the pseudo image and the correct answer data is defined as first teacher data, the processor may train the machine learning model using second teacher data composed of the camera image captured by the optical camera and the correct answer data in addition to the first teacher data.

Further, a machine learning model for physique output that uses the camera image as input and derives physique information indicating a physique of the examination subject may be further trained using a plurality of teacher data for physique output composed of the pseudo image and correct answer data of physique information indicating a physique of the human body model.

The medical imaging apparatus may include at least one of a radiography apparatus or an ultrasound imaging apparatus.

The present disclosure relates to a learning method of training, via a computer, a machine learning model that uses, as input, a camera image obtained by imaging an examination subject in a state of being positioned with respect to a medical imaging apparatus with an optical camera, and derives an imaging part and an imaging direction of the examination subject shown in the camera image, the learning method comprising generating a plurality of pseudo images, which are pseudo images of a human body generated based on a human body model composed of three-dimensional computer graphics data and imitate the examination subject in a state of being positioned with respect to the medical imaging apparatus, for each combination of the imaging part and the imaging direction, and training the machine learning model using a plurality of teacher data composed of the generated pseudo image and correct answer data of the combination.

The present disclosure relates to an operation program of a learning device, the operation program causing a computer to function as a learning device that trains a machine learning model that uses, as input, a camera image obtained by imaging an examination subject in a state of being positioned with respect to a medical imaging apparatus with an optical camera, and derives an imaging part and an imaging direction of the examination subject shown in the camera image, the operation program causing the computer to function as the learning device that generates a plurality of pseudo images, which are pseudo images of a human body generated based on a human body model composed of three-dimensional computer graphics data and imitate the examination subject in a state of being positioned with respect to the medical imaging apparatus, for each combination of the imaging part and the imaging direction, and trains the machine learning model using a plurality of teacher data composed of the generated pseudo image and correct answer data of the combination.

The present disclosure relates to a teacher data generation device that generates teacher data used to train a machine learning model that uses, as input, a camera image obtained by imaging an examination subject in a state of being positioned with respect to a medical imaging apparatus with an optical camera, and derives an imaging part and an imaging direction of the examination subject shown in the camera image, the teacher data generation device comprising a processor, and a memory connected to or built in the processor, in which the processor uses three-dimensional computer graphics data that configures a human body model for generating a pseudo image of a human body and is attached with a parameter for changing at least one of a posture or appearance of the human body model, generates a plurality of the pseudo images in which at least one of the posture or the appearance of the human body model is different by changing the parameter, for each combination of the imaging part and the imaging direction, and generates a plurality of teacher data composed of the generated plurality of pseudo images and correct answer data of the combination.

The present disclosure relates to a machine learning model that uses, as input, a camera image obtained by imaging an examination subject in a state of being positioned with respect to a medical imaging apparatus with an optical camera, and derives an imaging part and an imaging direction of the examination subject shown in the camera image, in which the machine learning model is trained using a plurality of teacher data that are composed of a pseudo image, which is a pseudo image of a human body generated based on a human body model composed of three-dimensional computer graphics data and imitates the examination subject in a state of being positioned with respect to the medical imaging apparatus, and correct answer data of a combination of the imaging part and the imaging direction, the plurality of teacher data being generated for each combination.

The present disclosure relates to a medical imaging apparatus comprising the machine learning model.

According to the technology of the present disclosure, it is possible to efficiently train the machine learning model that derives the imaging part and the imaging direction of the examination subject shown in the camera image as compared with a case in which only the camera image is used as the teacher data.

BRIEF DESCRIPTION OF THE DRAWINGS

Exemplary embodiments according to the technique of the present disclosure will be described in detail based on the following figures, wherein:

FIG. 11 is a diagram showing an example of the pseudo image, FIG. 13 is a diagram showing an example of the pseudo image, FIG. 14 is a diagram showing an example of the pseudo image, FIG. 15 is a diagram showing an example of the pseudo image.

DETAILED DESCRIPTION

Figure 1:
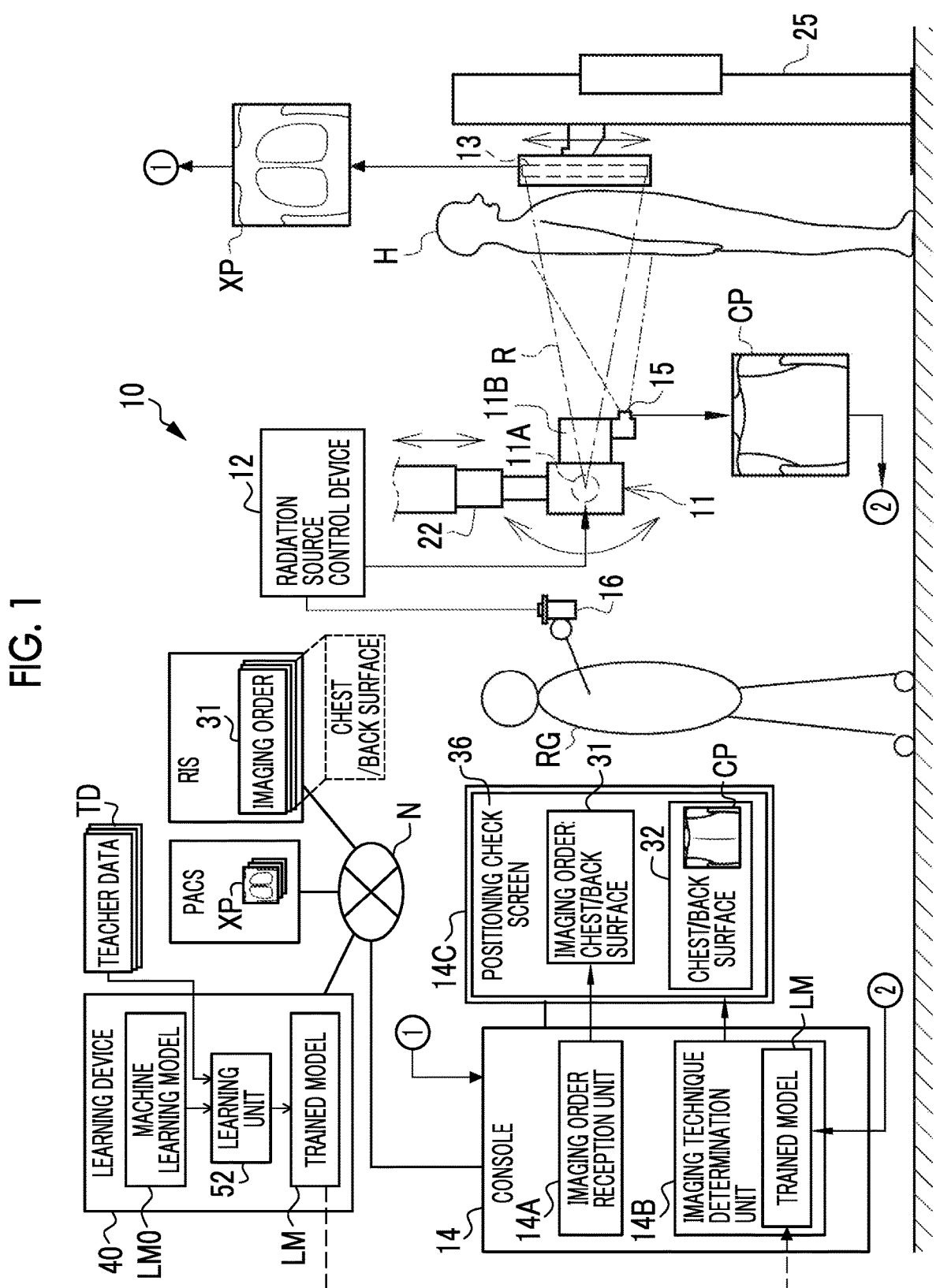
FIG. 1 is a diagram showing a schematic configuration of a learning device and a radiography system.

FIG. 1 is a diagram showing an outline of an entire configuration of a learning device 40 and a radiography system 10 according to the present disclosure. The radiography system 10 is an example of a medical imaging apparatus according to the technology of the present disclosure, and is also an example of a radiography apparatus. The radiography system 10 obtains a radiation image XP of an examination subject H by imaging the examination subject H using radiation R. In addition, in a case of performing radiography using the radiography system 10, a radiologist (hereinafter, simply referred to as a technician) RG which is an operator, performs positioning of the examination subject H with respect to the radiography system 10.

The radiography system 10 according to the present example has an imaging support function that supports check work in which the technician RG checks whether or not the examination subject H is appropriately positioned according to the imaging order 31. Details will be described below, but the imaging support function is performed using a trained model LM generated by training a machine learning model LM0. The learning device 40 includes a learning unit 52 that trains the machine learning model LM0. The learning unit 52 is used to train the machine learning model LM0 in order to generate the trained model LM provided in the radiography system 10.

Here, although the trained model LM is also a machine learning model, it is distinguished from the machine learning model LM0 to be trained by the learning device 40 for convenience, and a machine learning model that is trained by the learning device 40 at least once and is put into operation in the radiography system 10 is referred to as the trained model LM. It should be noted that the machine learning model LM0 may be an untrained machine learning model or may be the trained model LM to be additionally trained. Hereinafter, the learning device 40 will be described after the outline of the radiography system 10 is described.

As shown in FIG. 1, the radiography system 10 comprises a radiation source 11, a radiation source control device 12, an electronic cassette 13, and a console 14. The electronic cassette 13 is an example of a radiation image detector that detects the radiation image XP of the examination subject H by receiving the radiation R transmitted through the examination subject H, and is a portable radiation image detector. Also, the radiography system 10 according to the present example includes an optical camera 15. This configuration is a configuration for realizing the imaging support function described above, the optical camera 15 is used to image a state of the examination subject H positioned with respect to the radiography system 10.

The positioning in a case of performing the radiography is work of adjusting the relative positions of the examination subject H, and the electronic cassette 13 and the radiation source 11, and is performed as follows as an example. First, the technician RG aligns a position of the electronic cassette 13 with an imaging part of the examination subject H. In the example of FIG. 1, the electronic cassette 13 is disposed in a state of facing a chest of the examination subject H. Then, a position of the radiation source 11 is adjusted such that the electronic cassette 13 in a state of being positioned at the imaging part of the examination subject H and the radiation source 11 face each other. In addition, in the example of FIG. 1, the radiation source 11 faces a back surface of the chest of the examination subject H, and an imaging direction, which is a direction of the irradiation with the radiation R, is the back surface of the examination subject H. In a case in which the chest is imaged from the front surface, the technician RG makes the front surface of the chest of the examination subject H face the radiation source 11. By performing such positioning, the back surface of the examination subject H is irradiated with the radiation R, so that the radiation image XP of the chest of the examination subject H can be captured.

In the example of FIG. 1, the electronic cassette 13 is set on an upright imaging table 25 for imaging the examination subject H in an upright posture. The electronic cassette 13 may be set on a decubitus imaging table or the like for imaging the examination subject H in a decubitus posture. Further, since the electronic cassette 13 is portable, it can be removed from the imaging table and used alone.

The radiation source 11 comprises a radiation tube 11A that generates the radiation R and an irradiation field limiter 11B that limits an irradiation field that is a region irradiated with the radiation R. The radiation tube 11A includes, for example, a filament that releases thermoelectrons and a target that collides with the thermoelectrons released from the filament and emits the radiation. In the irradiation field limiter 11B, for example, by disposing four lead plates that cut the radiation R on the respective sides of the quadrangle, a quadrangular irradiation aperture through which the radiation R is transmitted is formed in the center. In the irradiation field limiter 11B, a size of the irradiation aperture is changed by moving the position of the lead plate. As a result, the size of the irradiation field is adjusted. An irradiation field display light source (not shown) for visualizing the irradiation field by projecting visible light to the examination subject H through the irradiation aperture may be built in the radiation source 11, in addition to the radiation tube 11A.

In the example of FIG. 1, the radiation source 11 is of a ceiling-suspended type, and is attached to a stretchable support column 22. The radiation source 11 can adjust a height of the radiation source 11 in a vertical direction by expanding and contracting the support column 22. In addition, the support column 22 is attached to a ceiling traveling device (not shown) traveling on a rail disposed on the ceiling, and is movable in a horizontal direction along the rail. Further, the radiation source 11 can rotate about a focal point of the radiation tube 11A as the center of rotation. The radiation source 11 can adjust the direction of the irradiation with the radiation R by various displacement mechanisms as described above.

The radiation source control device 12 controls the radiation source 11. An operation panel (not shown) is provided in the radiation source control device 12. The technician RG operates the operation panel to set an irradiation condition of the radiation and the size of the irradiation aperture of the irradiation field limiter 11B. The irradiation condition of the radiation includes a tube voltage (unit: kv) applied to the radiation source 11, a tube current (unit: mA), and an irradiation time (unit: mS) of the radiation.

The radiation source control device 12 includes a voltage generation unit that generates a voltage applied to the radiation tube 11A, and a timer. The radiation source control device 12 controls the voltage generation unit and the timer to operate the radiation source 11 to generate the radiation R according to the irradiation condition. In addition, an irradiation switch 16 is connected to the radiation source control device 12 via a cable or the like. The irradiation switch 16 is operated by the technician RG in a case of starting the irradiation with the radiation. In a case in which the irradiation switch 16 is operated, the radiation source control device 12 generates the radiation in the radiation tube 11A. Accordingly, the radiation R is emitted toward the irradiation field.

As described above, the electronic cassette 13 detects the radiation image XP based on the radiation R emitted from the radiation source 11 and transmitted through the imaging part of the examination subject H. The electronic cassette 13 includes, for example, a wireless communication unit and a battery, and can be operated wirelessly. The electronic cassette 13 wirelessly transmits the detected radiation image XP to the console 14.

The optical camera 15 is an optical digital camera including a complementary metal oxide semiconductor (CMOS) type image sensor, a charge coupled device (CCD) type image sensor, or the like, and performs the imaging based on visible light as an example. The optical camera 15 can capture, as an example, a still image and capture a moving image.

The optical camera 15 images the examination subject H in a state of being positioned with respect to the electronic cassette 13 and the radiation source 11. Therefore, as an example, the optical camera 15 is attached to, for example, an outer peripheral portion of the irradiation field limiter 11B of the radiation source 11, and is disposed near the irradiation aperture. In addition, the optical camera 15 is attached in a posture in which an optical axis of the optical camera 15 and an irradiation axis of the radiation R of the radiation source 11 are parallel to each other. The optical camera 15 optically images a region including the irradiation field of the radiation R to generate a camera image CP which is an optical image by visible light. Since the radiation source 11 is positioned at the imaging part of the examination subject H, the imaging part of the examination subject H is visualized on the camera image CP captured in that state. In the present example, the camera image CP is, for example, a color still image.

In the present example, the optical camera 15 is attached to the outer peripheral portion of the irradiation field limiter 11B, but the optical camera 15 does not have to be attached to the outer peripheral portion of the radiation source 11, and may be built in the radiation source 11.

The optical camera 15 is connected to the console 14 by wire or wirelessly. The console 14 functions as a control device of the optical camera 15 to control an imaging operation of the optical camera 15, such as an imaging timing. For example, the technician RG inputs an imaging instruction from the optical camera 15 to the console 14 in a state in which the examination subject H is positioned.

The console 14 is connected to a radiology information system (RIS) and a picture archiving and communication system (PACS) provided in the radiography system 10 via a network N.

The RIS is a device that manages an imaging order 31 with respect to the radiography system 10. For example, in a medical facility, a doctor in a medical department, such as internal medicine or surgery, requests a radiography department in charge of the radiography to perform the radiography. The imaging order 31 is issued by the doctor in the medical department to the radiography department. The RIS manages the imaging order 31 from the doctor in the medical department. In a case in which there are a plurality of radiography systems 10, a plurality of imaging orders 31 managed by the RIS are assigned to the plurality of radiography systems 10 according to a content of the imaging order, an operating state of the radiography system 10, and the like. The console 14 receives the imaging order 31 transmitted from the RIS.

Figure 2:
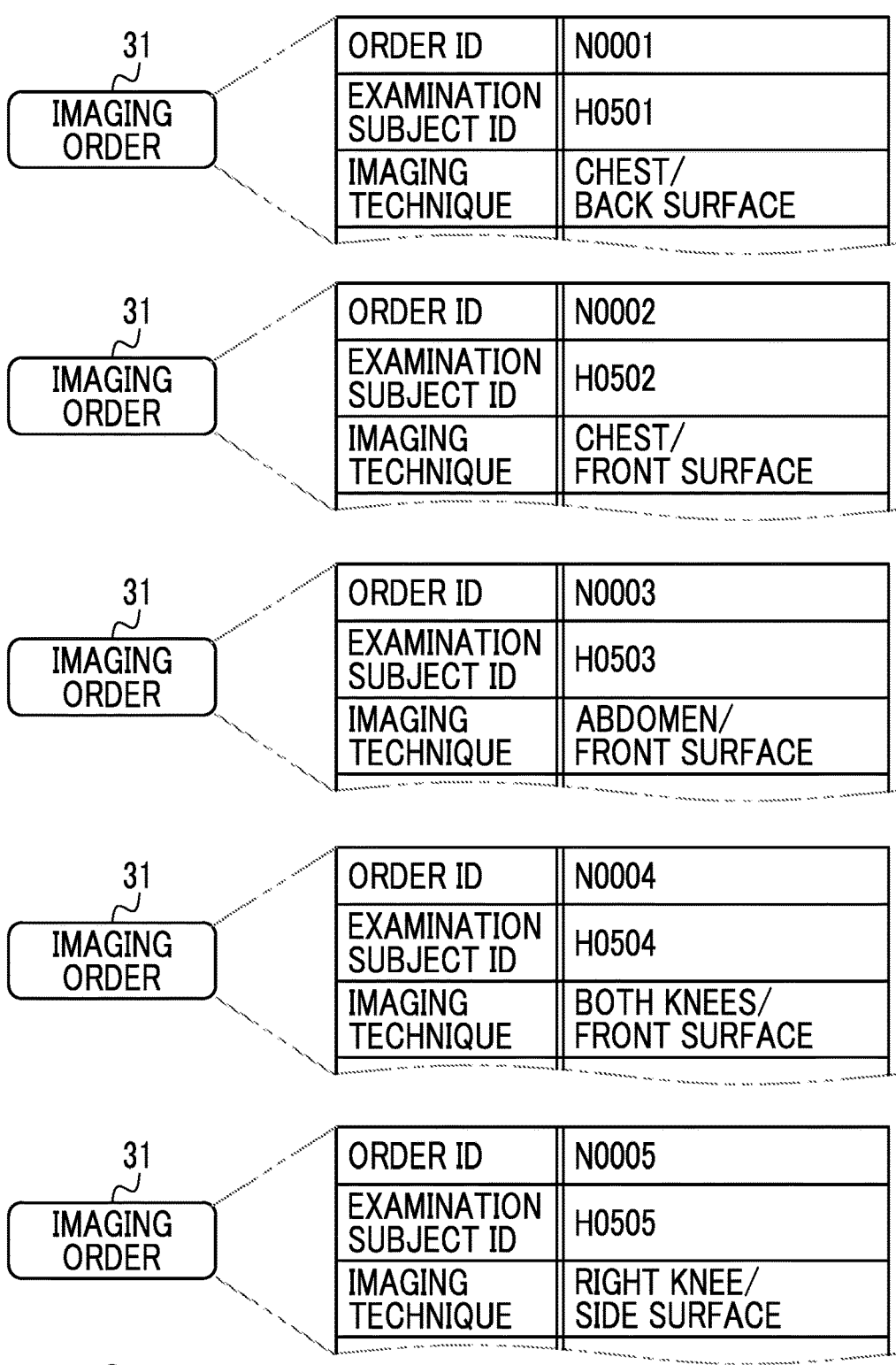
FIG. 2 is a diagram for describing an imaging order.

FIG. 2 shows an example of the imaging order 31. The content of the imaging order 31 includes an order identification data (ID) issued for each order, an examination subject ID issued for each examination subject H, an imaging technique, an imaging purpose (not shown), and the like. Here, the imaging technique is an imaging method defined by at least a combination of the imaging part and the imaging direction. In the imaging order 31, the doctor designates the imaging technique including the imaging part and the imaging direction according to an examination purpose of the examination subject H. For example, in a case in which the examination purpose is a diagnosis of lung cancer, the imaging technique is designated in which the imaging part is the chest and the imaging direction is the back surface or the front surface. In FIG. 2, in the imaging order 31 in which the order ID is "N0001", "chest/back surface" is designated as the imaging technique. In the imaging order 31 in which the order ID is "N0002", "chest/front surface" is designated as the imaging technique. In the imaging order 31 in which the order ID is "N0003", "abdomen/front surface" is designated as the imaging technique. In the imaging order 31 in which the order ID is "N0004", "both knees/front surface" is designated as the imaging technique. In the imaging order 31 in which the order ID is "N0005", "right knee/side surface" is designated as the imaging technique.

Figure 3:
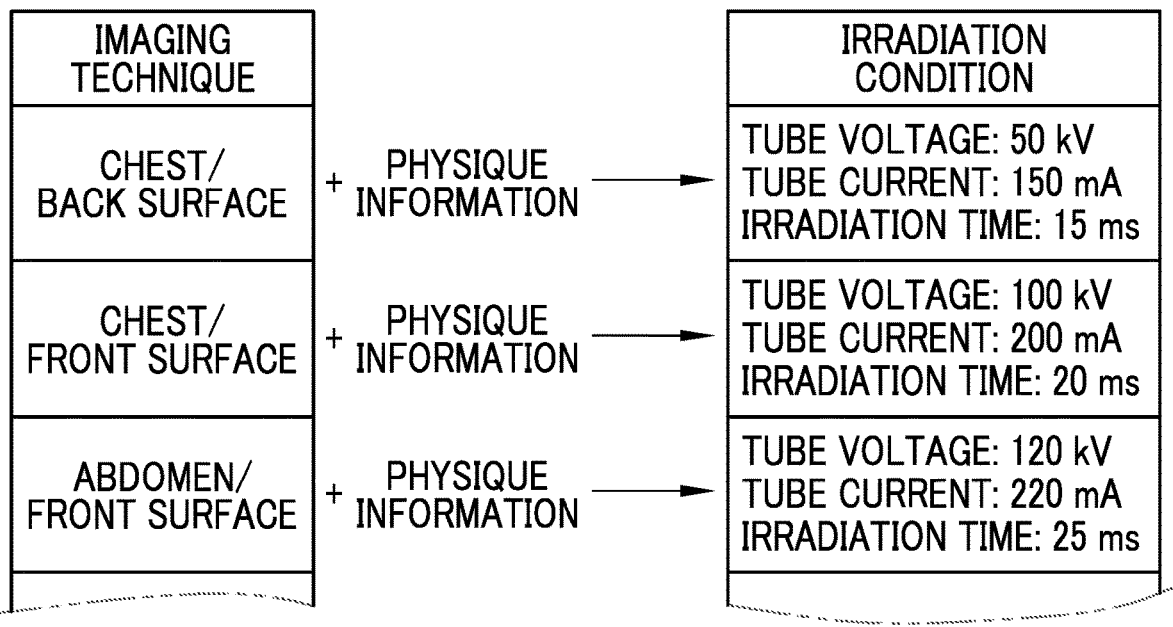
FIG. 3 is a diagram for describing a method of deciding an irradiation condition.

In addition, as shown in FIG. 3, information on the imaging technique is used for the technician RG to decide the irradiation condition of the radiation source 11 together with physique information of the examination subject H. For example, in a case in which the imaging technique is "chest/back surface", the technician RG estimates a body thickness of the chest in consideration of the physique information (mainly a body thickness) of the examination subject H, and decides the tube voltage, the tube current, and the irradiation time. In general, since the transmittance of the radiation R is lower as the body thickness is larger, a larger irradiation dose of the radiation R is set. The irradiation dose is defined by an mAs value, which is the product of the tube current and the irradiation time.

Returning to FIG. 1, the PACS stores the radiation image XP captured by the radiography system 10. The console 14 transmits the radiation image XP received from the electronic cassette 13 to the PACS, in a state of being associated with the imaging order 31. In the PACS, the radiation image XP is stored in a state of being converted into an image file in a format conforming to, for example, a digital imaging and communication in medicine (DICOM) standard. The radiation image XP stored in the PACS is used for viewing by the doctor or the like in the medical department that issues the imaging order 31.

The console 14 is composed of a computer, such as a personal computer or a workstation. The console 14 has an order reception function for receiving the imaging order 31, a setting function for making various settings of the electronic cassette 13, and a function of displaying the radiation image XP received from the electronic cassette 13 on a display 14C. The console 14 has the imaging support function described above, in addition to these basic functions.

Figure 4:
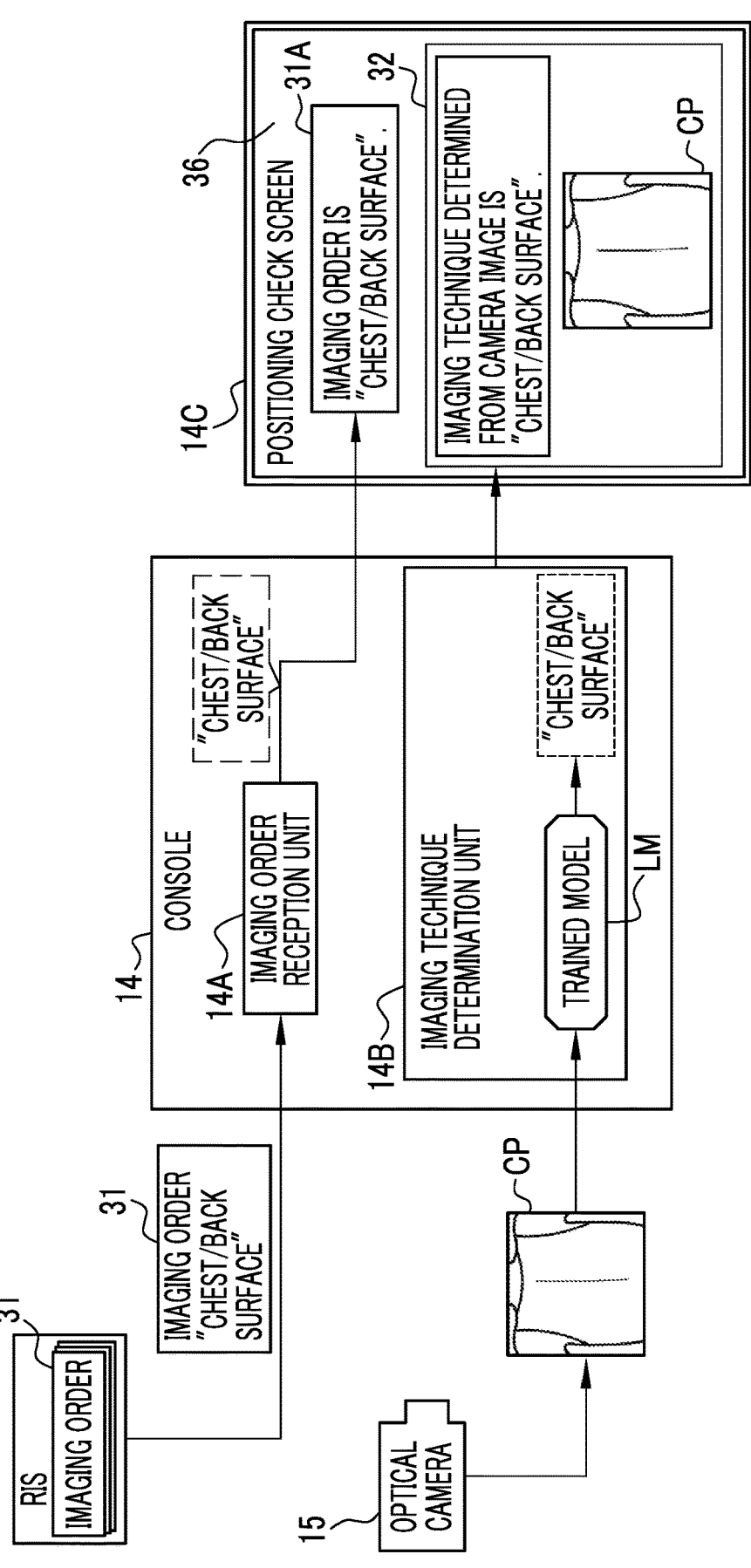
FIG. 4 is a diagram for describing a function of a console.

As shown in an enlarged view in FIG. 4 in addition to FIG. 1, the console 14 comprises an imaging order reception unit 14A and an imaging technique determination unit 14B as a configuration related to the imaging support function. The imaging order reception unit 14A displays the imaging order 31 received from the RIS on the display 14C. The imaging technique determination unit 14B derives the imaging technique of the positioned examination subject H by executing an image analysis on the camera image CP using the trained model LM. The imaging technique determination unit 14B outputs a determination result 32 including the imaging technique derived from the trained model LM. The console 14 displays a positioning check screen 36 including the imaging order 31 received by the imaging order reception unit 14A and the determination result 32 by the imaging technique determination unit 14B on the display 14C.

On the positioning check screen 36, as an example, the imaging order 31 and the determination result 32 are displayed side by side for easy comparison. Regarding the imaging order 31, only a part related to the imaging technique is extracted, and for example, a message 31A, such as "The imaging order is "chest/back surface"", is displayed. In addition, the determination result 32 includes the imaging technique determined by the imaging technique determination unit 14B (in the example of FIG. 4, "chest/back surface") and the camera image CP. In the determination result 32, as an example, the imaging technique is displayed in a form of a message, such as "The imaging technique determined from the camera image is "chest/back surface"".

Through the positioning check screen 36, the technician RG can visually collate the imaging order 31 with the imaging technique included in the determination result 32 to check whether or not the positioning state of the examination subject H conforms to the imaging order 31.

Figure 5:
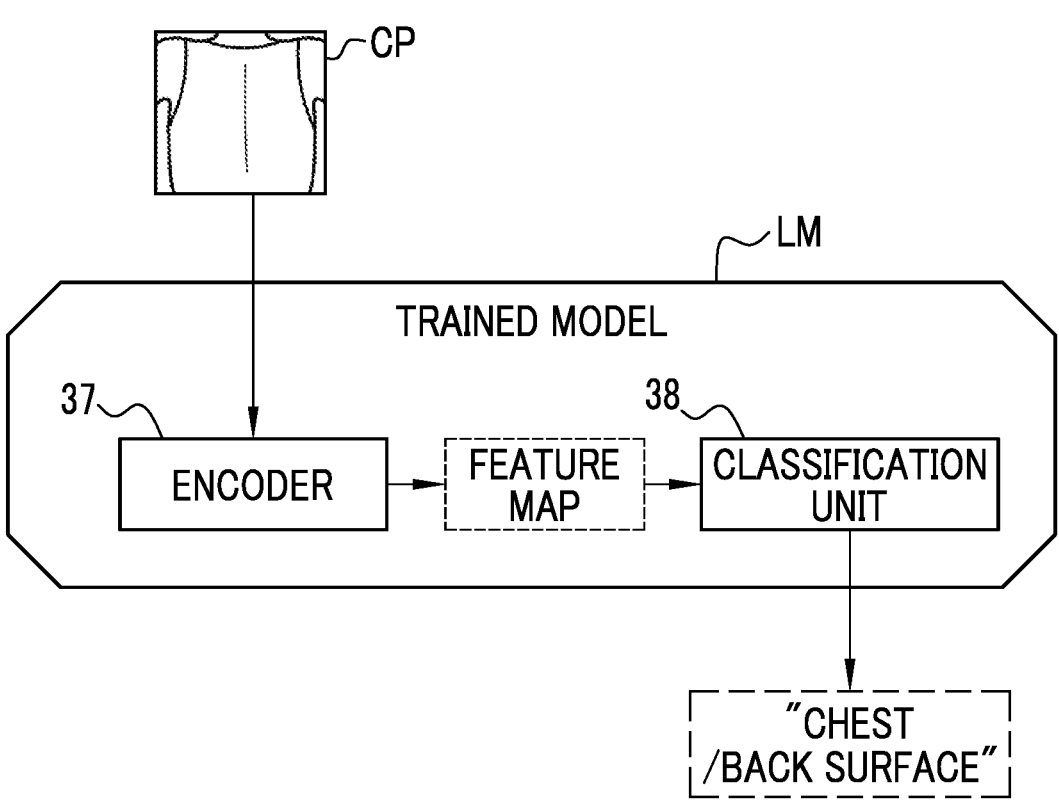
FIG. 5 is a diagram for describing a trained model.

As shown in FIG. 5, as the trained model LM, for example, a convolutional neural network (CNN) suitable for the image analysis is used. The trained model LM includes, for example, an encoder 37 and a classification unit 38.

The encoder 37 is composed of the CNN, and executes convolution processing and pooling processing on the camera image CP to extract a plurality of types of feature maps representing the features of the camera image CP. As is well known, in the CNN, the convolution is spatial filtering processing using a plurality of types of filters having a size of, for example, 3×3. In a case of the 3×3 filter, a filter coefficient is assigned to each of 9 cells. In the convolution, the cell of the center of the filter is aligned with a pixel of interest of the camera image CP, and the product sum of the pixel values of a total of 9 pixels of the pixel of interest and 8 pixels surrounding the pixel of interest is output. The output product sum represents a feature amount of a region of interest to which the filter is applied. Then, for example, by applying the filter to all the pixels of the camera image CP while shifting the pixel of interest one by one, the feature map having the feature amount equivalent to the number of pixels of the camera image CP is output. By applying a plurality of types of filters having different filter coefficients, the plurality of types of feature maps are output. The number of feature maps according to the number of filters is also referred to as the number of channels.

Such convolution is repeated while reducing a size of the camera image CP. The processing of reducing the size of the camera image CP is referred to as the pooling processing. The pooling processing is executed by executing thinning-out processing, averaging processing, or the like of adjacent pixels. By the pooling processing, the size of the camera image CP is gradually reduced to ½, ¼, and ⅛. The feature maps of the plurality of channels are output for each size of the camera image CP. In a case in which the size of the camera image CP is large, detailed morphological features of the subject are visualized in the camera image CP. However, in a case in which the size of the camera image CP is small (that is, in a case in which a resolution is low), detailed morphological features of the subject are discarded from the camera image CP, and only rough morphological features of the subject are visualized in the camera image CP. Therefore, the feature map in a case in which the camera image CP is large represents the microscopic features of the subject visualized in the camera image CP, and the feature map in a case in which the size is small represents the macroscopic features of the subject visualized in the camera image CP. The encoder 37 executes such convolution processing and pooling processing on the camera image CP to extract the feature maps of the plurality of channels representing the macroscopic and microscopic features of the camera image CP.

The trained model LM is, for example, a classification model that derives one imaging technique having the highest possibility as the imaging technique shown by the camera image CP from a plurality of imaging techniques. For this reason, the classification unit 38 is provided as a configuration for deriving one imaging technique based on the feature amount of the camera image CP extracted by the encoder 37. The classification unit 38 comprises, for example, a plurality of perceptrons having one output node for a plurality of input nodes. In addition, weights indicating the importance of the plurality of input nodes are assigned to the perceptrons. In each perceptron, the product sum, which is the sum of the values obtained by multiplying each of the input values input to the plurality of input nodes by the weight, is output from the output node as an output value. Such a perceptron is formulated by an activation function, such as a sigmoid function, as an example.

In an output unit, a multi-layered neural network having a plurality of interlayers between an input layer and an output layer is formed by connecting the output and the input of the plurality of perceptrons. As a method of connecting the plurality of perceptrons between layers, for example, full connection in which all output nodes of the previous layer are connected to one input node of the next layer is adopted.

All the feature amounts included in the feature map of the camera image CP are input to the input layer of the classification unit 38. The feature amount is input to the input node as the input value in the perceptron that configures each layer of the classification unit 38. Then, the product sum, which is the sum of values obtained by multiplying the feature amount by the weight for each input node, is output as the output value from the output node, and the output value is passed to the input node of the perceptron of the next layer. In the classification unit 38, the output layer of the final layer outputs a probability of each of a plurality of types of imaging techniques by using a softmax function or the like based on the output values of the plurality of perceptrons. One imaging technique with the highest possibility is derived based on this probability. FIG. 5 shows an example in which the imaging technique of "chest/back surface" is derived based on the camera image CP.

The present example is an example, and the trained model LM may have another aspect as long as the trained model LM is v classification model in which the imaging technique can be derived based on the camera image CP.

Figure 6:
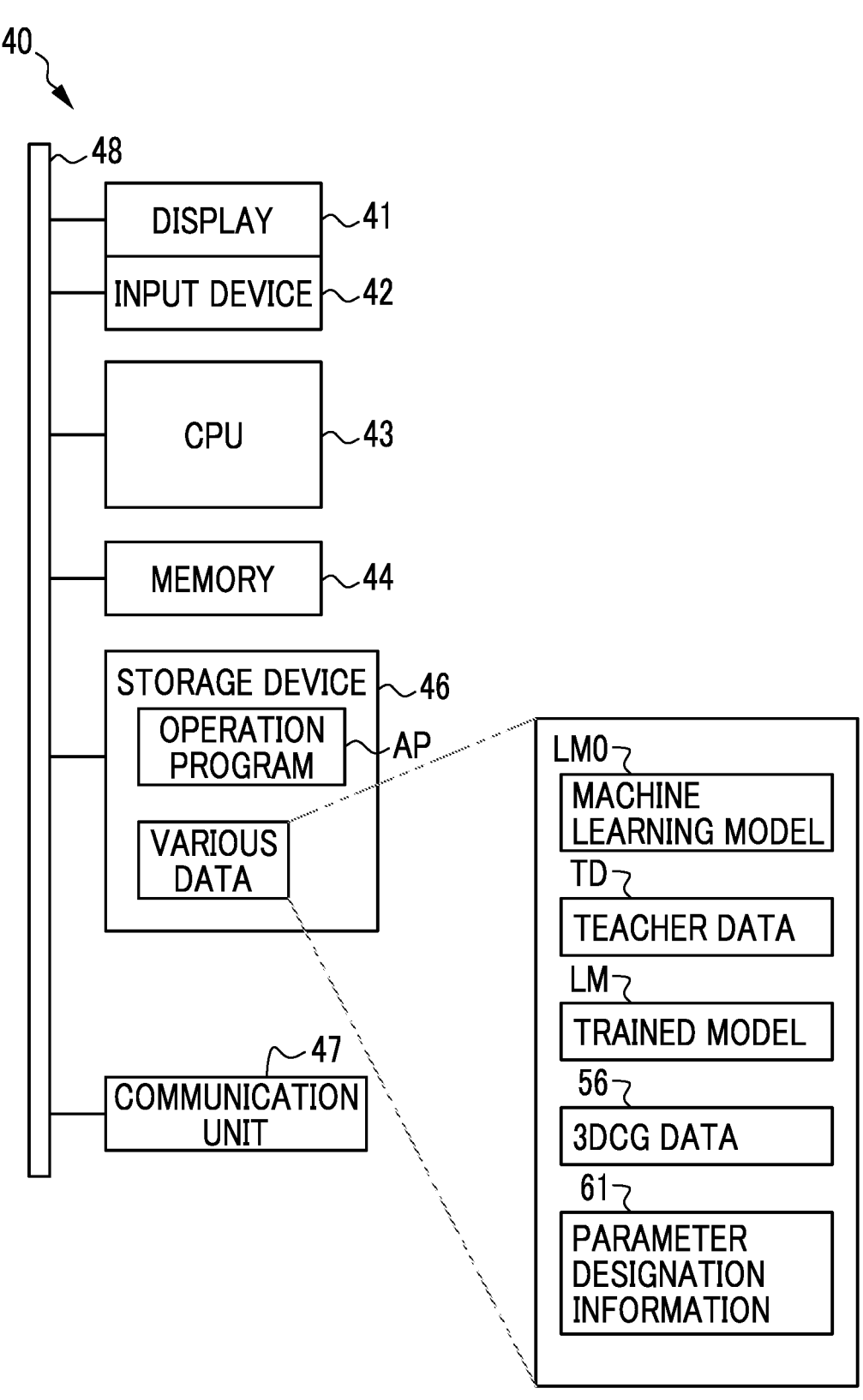
FIG. 6 is a diagram showing a hardware configuration of the learning device.

Hereinafter, the learning device 40 will be described with reference to FIGS. 6 and 7. FIG. 6 shows a hardware configuration of the learning device 40. The learning device 40 is composed of a computer, such as a personal computer or a workstation. The learning device 40 comprises a display 41, an input device 42, a CPU 43, a memory 44, a storage device 46, and a communication unit 47. These units are connected to each other via a data bus 48.

The display 41 is a display unit that displays various operation screens provided with an operation function by a graphical user interface (GUI). The input device 42 is an input operation unit including a touch panel, a keyboard, or the like.

The storage device 46 is composed of, for example, a hard disk drive (HDD) and a solid state drive (SSD), and is built in the learning device 40 or externally connected to the learning device 40. The external connection is connected through a cable or a network. A control program, such as an operating system, various application programs, and various data associated with these programs are stored in the storage device 46. One of the various application programs includes an operation program AP causing the computer to function as the learning device 40. Various data include the machine learning model LM0 that is a target of training processing, the trained model LM in which the training processing is terminated, teacher data TD used for training, three-dimensional computer graphics data (hereinafter, referred to as 3DCG data) 56, and parameter designation information 61.

The memory 44 is a work memory for the CPU 43 to execute the processing. The CPU 43 loads the program stored in the storage device 46 into the memory 44 and executes the processing according to the program to collectively control each unit of the learning device 40.

The communication unit 47 communicates with the console 14 via the network N. For example, the communication unit 47 is used to deliver the trained model LM, such as transmission of the trained model LM from the learning device 40 to the console 14, and transmission of the trained model LM from the console 14 to the learning device 40 in order to additionally train the trained model LM of the console 14.

It should be noted that, although the hardware configuration of the computer for realizing the learning device 40 is shown in FIG. 6, the same applies to the hardware configuration of the console 14. That is, the configuration, such as the imaging order reception unit 14A and the imaging technique determination unit 14B of the console 14, is realized by the cooperation between the processor such as the CPU 43, the memory built in or connected to the CPU 43 such as the memory 44, and the program executed by the CPU 43.

Figure 7:
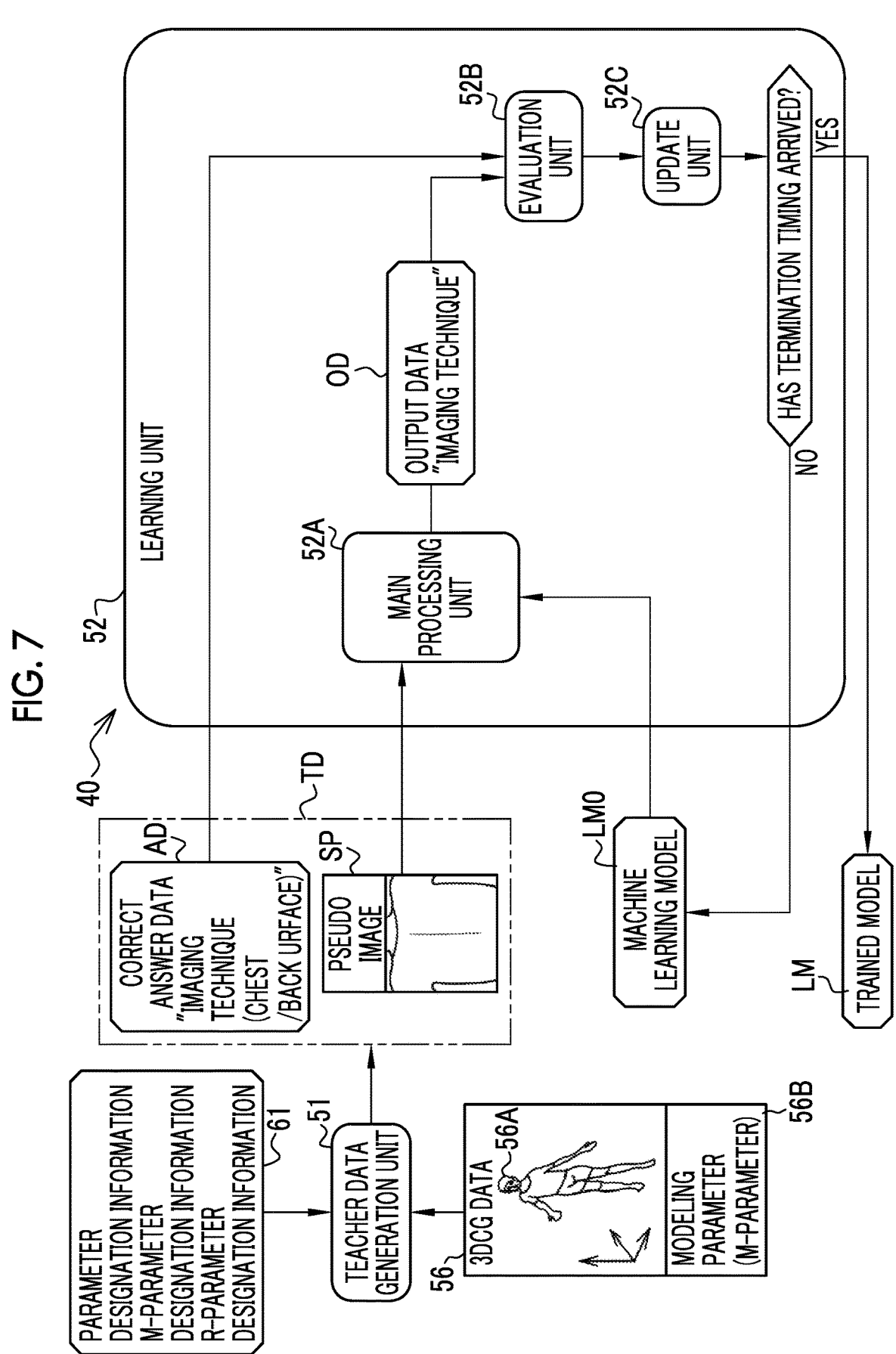
FIG. 7 is a diagram for describing a function of the learning device.

As shown in FIG. 7, the learning device 40 includes a teacher data generation unit 51 and the learning unit 52. Each of these processing units is realized by the CPU 43. The teacher data generation unit 51 generates a plurality of pseudo images SP of a human body generated based on a human body model 56A composed of the 3DCG data 56 for each imaging technique that is the combination of the imaging part and the imaging direction. The pseudo image SP is a two-dimensional image that imitates the examination subject H in a state of being positioned with respect to the radiography system 10 which is an example of the medical imaging apparatus.

More specifically, the teacher data generation unit 51 generates the pseudo image SP based on the three-dimensional computer graphics data (hereinafter, referred to as 3DCG data) 56 and the parameter designation information 61. The parameter designation information 61 includes modeling parameter (hereinafter, referred to as M-parameter) designation information 61M designated in a case of modeling of the three-dimensional human body model 56A that imitates the human body, and rendering parameter (hereinafter, referred to as R-parameter) designation information 61R designated in a case of rendering the human body model 56A by setting the viewpoint. Details of the modeling of the human body model 56A and a method of generating the pseudo image SP by rendering the human body model 56A will be described below.

Then, the teacher data generation unit 51 generates the teacher data TD composed of the generated pseudo image SP and correct answer data AD of the combination of the imaging part and the imaging direction. The teacher data TD shown in FIG. 7 is an example in a case in which the imaging technique, which is the combination of the imaging part and the imaging direction, is "chest/back surface". That is, in the teacher data TD shown in FIG. 7, the pseudo image SP is an image showing the back surface of the chest of the human body and showing "chest/back surface" as the imaging technique, and the imaging technique of the correct answer data AD is also "chest/back surface" correspondingly.

Also, the learning unit 52 includes a main processing unit 52A, an evaluation unit 52B, and an update unit 52C. The main processing unit 52A reads the machine learning model LM0, which is the target of the training processing, from the storage device 46, and inputs the pseudo image SP to the read machine learning model LM0. Then, the machine learning model LM0 is caused to execute processing of deriving the imaging technique indicated by the input pseudo image SP. The basic configuration of the machine learning model LM0 is the same as the trained model LM described with reference to FIG. 5. However, in a state before the machine learning model LM0 is trained, the values of the filter coefficient in the encoder 37, the weight of the perceptron in the classification unit 38, and the like are different from those of the trained model LM.

The main processing unit 52A outputs the imaging technique derived by the machine learning model LM0 to the evaluation unit 52B as output data OD. The evaluation unit 52B compares the output data OD with the correct answer data AD included in the teacher data TD, and evaluates a difference between the output data OD and the correct answer data AD as a loss using a loss function. Similarly to the trained model LM, in the machine learning model LM0 according to the present example, each of the plurality of imaging techniques shown by the pseudo image SP is output as the probability. Therefore, in both cases of a case of the loss in a case in which the imaging technique of the output data OD is an incorrect answer and a case in which the imaging technique of the output data OD is a correct answer, in a case in which the output value output as the probability is lower than a target value, a difference between the target value and the output value is evaluated as the loss. The evaluation unit 52B outputs the evaluated loss as an evaluation result to the update unit 52C.

The update unit 52C updates values of the filter coefficient in the encoder 37, the weight of the perceptron in the classification unit 38, and the like such that the loss included in the evaluation result is reduced. The series of processing from the input of the teacher data TD to the update are repeated until a termination timing arrives. The termination timing is, for example, a case in which all the training of the planned number of teacher data TD is terminated, a case in which the loss is lower than the target value, and the like. Hereinafter, the method of generating the pseudo image SP executed by the teacher data generation unit 51 will be described in detail with reference to FIGS. 8 to 15. First, a configuration of the 3DCG data 56 will be described with reference to FIG. 8. The 3DCG data 56 according to the present example is data for configuring the human body model 56A. A modeling parameter (referred to as M-parameter) 56B is attached to the 3DCG data 56 in addition to the configuration data of the human body model 56A. The human body model 56A is three-dimensional (X direction, Y direction, and Z direction) data that imitates the human body. The M-parameter 56B is a parameter that can be changed in a case of modeling of the human body model 56A, and is a parameter for changing at least one of a posture or the appearance of the human body model 56A. The M-parameter 56B is a parameter designated by the M-parameter designation information 61M.

Specifically, the M-parameter 56B includes various items, such as the physique information, gender, posture information, a skin color, a hair color, a hairstyle, and clothes, as an example. The physique information includes various items, such as a height, a weight, a sitting height, an inseam length, a head circumference, a neck circumference, a shoulder width, a chest circumference, a waist circumference, a hand length, a wrist circumference, a hand width, a foot length, a foot width, a thigh circumference, and a calf circumference. The posture information includes items, such as the presence or absence of bending of limbs, in addition to items indicating basic postures, such as an upright posture, a decubitus posture, and a sitting posture. Regarding the bending of the limbs, for example, a part to be bent, such as a right hand, a left hand, a right knee, a left knee, and both knees, a bending direction, a bending angle, and the like are designated. In addition, it may be possible to designate an internal rotation or an external rotation of a knee joint in the M-parameter 56B. In this case, further, it may be possible to designate an internal or external rotation direction and a rotation angle.

As shown in FIG. 4, in the human body model 56A, the bendable joint 57 is set in advance, and a location in which the joint 57 is set can be bent. By designating such the M-parameter 56B, it is possible to change the posture and the appearance of the human body in a case of modeling of the human body model 56A. By finely setting the joint 57, it is possible to generate the pseudo images SP having slightly different postures even in the same imaging part. It should be noted that, in the human body model 56A, the number and location of the joints 57 may be optionally changed. As a result, it is possible to cause the human body model 56A to take a complicated posture by setting a large number of joints 57 of the human body model 56A. On the other hand, by setting the number of the joints 57 to be small, the number of the M-parameters 56B can be reduced, and the processing speed of the modeling can be increased.

Figure 9:
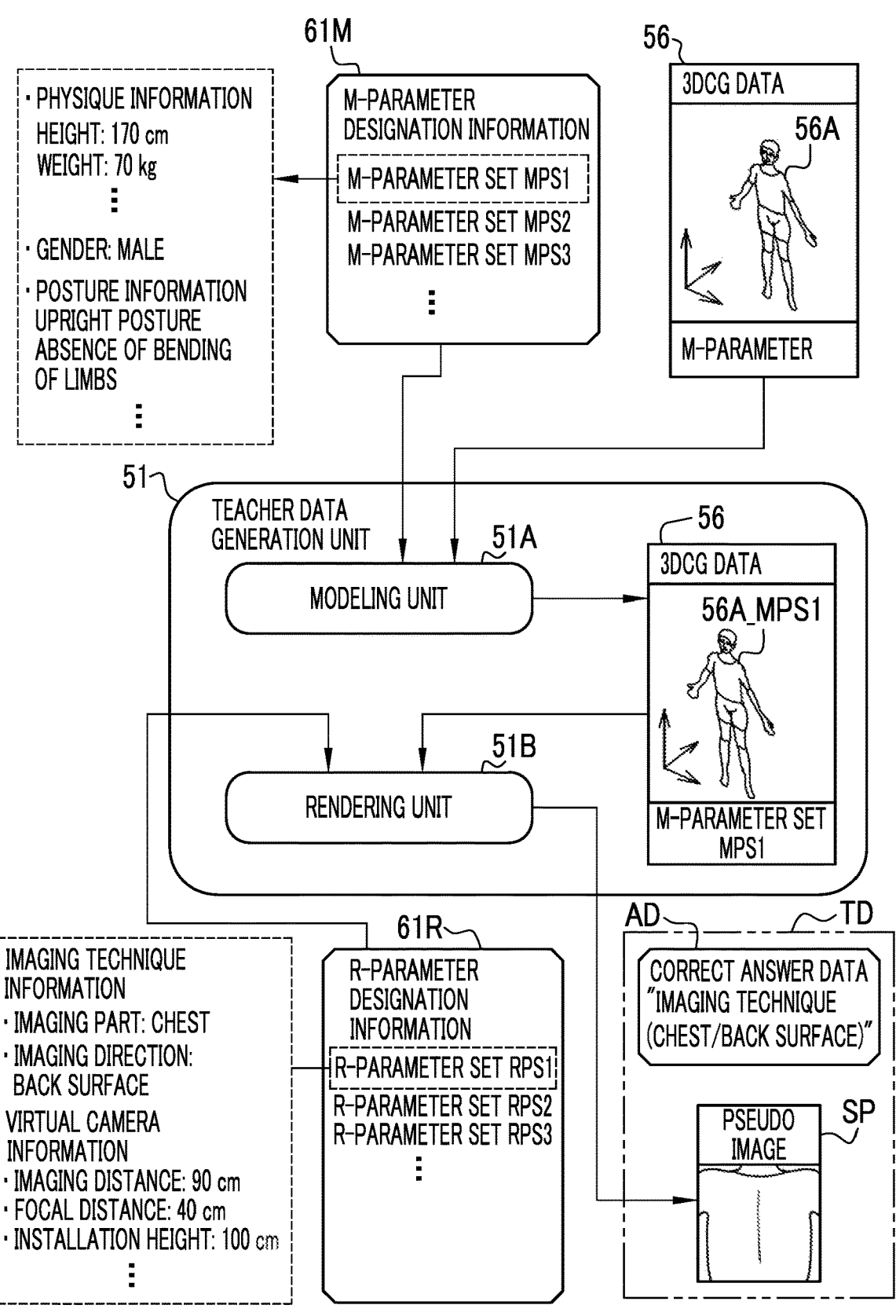
FIG. 9 is a diagram showing a function of a teacher data generation unit.

As shown in FIG. 9, the teacher data generation unit 51 includes a modeling unit 51A and a rendering unit 51B. The modeling unit 51A executes the modeling of the human body model 56A having the posture and the appearance of the human body designated by the M-parameter designation information 61M based on the 3DCG data 56 and the M-parameter designation information 61M. In FIG. 9, the M-parameter designation information 61M includes a plurality of M-parameter sets MPS. For each M-parameter set MPS, the human body models 56A having different postures and appearance are generated.

Figure 10:
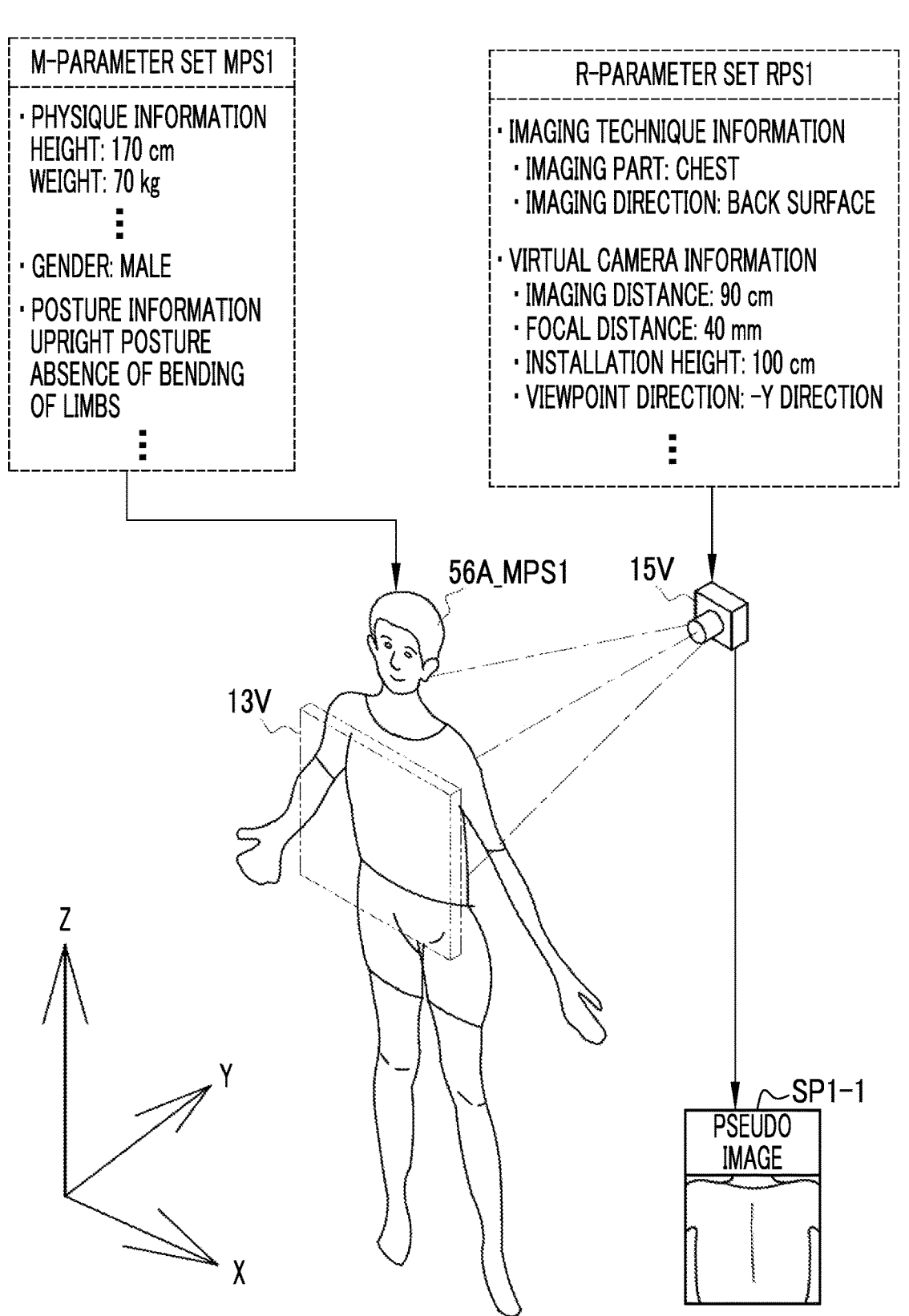
FIG. 10 is a diagram showing an example of a pseudo image.

As shown in FIG. 10, as an example, in an M-parameter set MPS1, a height of 170 cm and a weight of 70 kg are designated as the physique information, and a male is designated as the gender. The upright posture and the absence of the bending of the limbs are designated as the posture information. Based on such an M-parameter set MPS1, the modeling unit 51A generates the 3DCG data 56 including a human body model 56A_MPS1 having the posture and the appearance designated by the M-parameter set MPS1.

Figure 8:
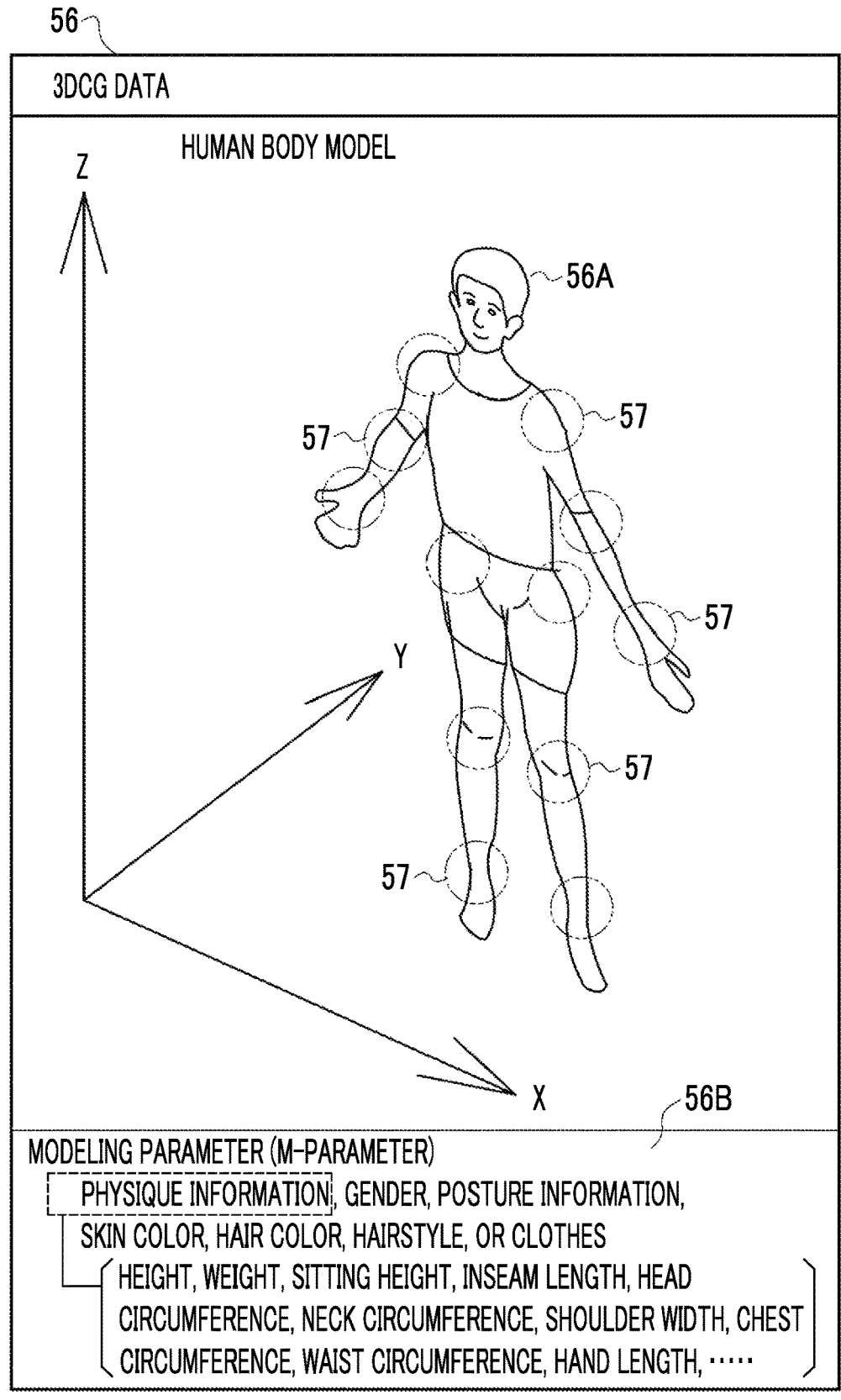
FIG. 8 is a diagram showing an example of 3DCG data.

In addition, as shown in the M-parameter 56B shown in FIG. 8, the skin color, the hairstyle, and the hair color of the human body model 56A can also be changed by designating the skin color, the hairstyle, the hair color, and the like in the M-parameter set MPS. In addition, it is also possible to change the clothes of the human body model 56A by designating the clothes in the M-parameter set MPS. As described above, the M-parameter 56B includes the physique information, the information on the appearance such as the skin color, and the posture information. Therefore, a plurality of human body models 56A having the same posture but different appearance can be generated by changing the physique information or the information on the appearance, such as the skin color, without changing the posture information, or the human body models 56A having different postures can be generated without changing the information on the appearance. In addition, in a case in which the imaging part is the chest, the hairstyle and the hair color are often not shown in the camera image CP of the chest, but in a case in which the imaging part is the head, the hairstyle and the hair color are shown in the camera image CP of the head. Therefore, it is effective to be able to change the hairstyle and the hair color in a case of the generation of the pseudo image SP of the head.

The rendering unit 51B can generate the two-dimensional pseudo image SP by using the human body model 56A (in the examples shown in FIGS. 9 and 10, the human body model 56A_MPS1) modeled by the modeling unit 51A and rendering the human body model 56A from the set viewpoint. According to the present example, the rendering is processing of virtually executing the processing of acquiring the camera image CP of the examination subject H by using the optical camera 15 using the 3DCG data 56. That is, a virtual camera 15V, which is virtual, corresponding to the optical camera 15 is set in a three-dimensional space in which the human body model 56A is disposed, and the human body model 56A that imitates the examination subject H is virtually imaged to acquire the pseudo image SP.

In FIG. 9, the R-parameter designation information 61R includes a plurality of R-parameter sets RPS. The pseudo image SP is generated for each R-parameter set RPS. The R-parameter set RPS is information for designating a viewpoint position or the like in a case in which the rendering unit 51B executes the rendering of the human body model 56A.

The R-parameter set RPS1 shown in FIGS. 9 and 10 includes, for example, imaging technique information and virtual camera information. The imaging technique information includes the imaging part and the imaging direction. In a case in which "chest/back surface" is designated as the imaging technique information, a position of the virtual camera 15V is roughly set at a position at which the chest of the human body model 56A can be imaged from the back surface.

The virtual camera information is information for defining the position of the virtual camera 15V in more detail, and an imaging distance, a focal length, an installation height, a viewpoint direction, and the like are set. The imaging distance is a distance from the virtual camera 15V to the human body model 56A. Since the virtual camera 15V virtualizes the optical camera 15 attached to the radiation source 11, the imaging distance is set to correspond to a source to image receptor distance (SID) which is a distance between the radiation source 11 and the electronic cassette 13. The SID is a value that is appropriately changed according to the imaging technique or the like, and the imaging distance in the example of FIG. 9 is set to 90 cm. The focal length is information for defining an angle of view of the virtual camera 15V. By defining the imaging distance and the focal length, an imaging range SR (see FIGS. 11 and 12, and the like) of the virtual camera 15V is defined. The imaging range SR is set to a size including the irradiation field of the radiation source 11. In the present example, the focal length is set to 40 mm, as an example. The installation height is a position in the Z direction in which the virtual camera 15V is installed, and is set according to the imaging part. In the present example, since the imaging part is the chest, the installation height is set to a height positioned on the chest of the upright human body model 56A. The viewpoint direction is set according to the posture of the human body model 56A and the imaging direction of the imaging technique. In the example shown in FIG. 10, since the human body model 56A is in the upright posture and the imaging direction is the back surface, the viewpoint direction is set to the −Y direction. In this way, the rendering unit 51B can change the viewpoint for generating the pseudo image SP according to the R-parameter set RPS.

The rendering unit 51B executes the rendering of the human body model 56A based on the R-parameter set RPS. As a result, the pseudo image SP is generated. In the example of FIG. 10, a pseudo image SP1-1 is generated by rendering a human body model 56A_MPS1, which is modeled by the modeling unit 51A based on the designation of the M-parameter set MPS1, based on the designation of the R-parameter set RPS1 by the rendering unit 51B.

In addition, in FIG. 10, a virtual cassette 13V, which is a virtual electronic cassette 13, is disposed in the three-dimensional space in which the human body model 56A is disposed. FIG. 10 is shown for convenience in order to clarify the position of the imaging part. However, in a case of the modeling, the virtual cassette 13V may be modeled in addition to the human body model 56A, and the rendering may be executed including the modeled virtual cassette 13V.

FIG. 11 shows an example in which the pseudo image SP in which the imaging technique is "chest/front surface" is generated. The M-parameter set MPS1 of FIG. 11 is the same as the example of FIG. 10, and the human body model 56A_MPS1 is the same as the example of FIG. 10. Unlike the R-parameter set RPS1 of FIG. 10, in an R-parameter set RPS2 of FIG. 11, the imaging direction is changed from "back surface" to "front surface". The viewpoint direction of the virtual camera information is changed to the "Y direction" with the change of the imaging direction. In the R-parameter set RPS2 of FIG. 11, other points are the same as those of the R-parameter set RPS1 of FIG. 10.

Based on such an R-parameter set RPS2, the position or the like of the virtual camera 15V is set, and the rendering is executed. As a result, the "chest" of the human body model 56A_MPS1 is imaged from the "front surface", and a pseudo image SP1-2 corresponding to the imaging technique of the "chest/front surface" is generated.

Figure 12:
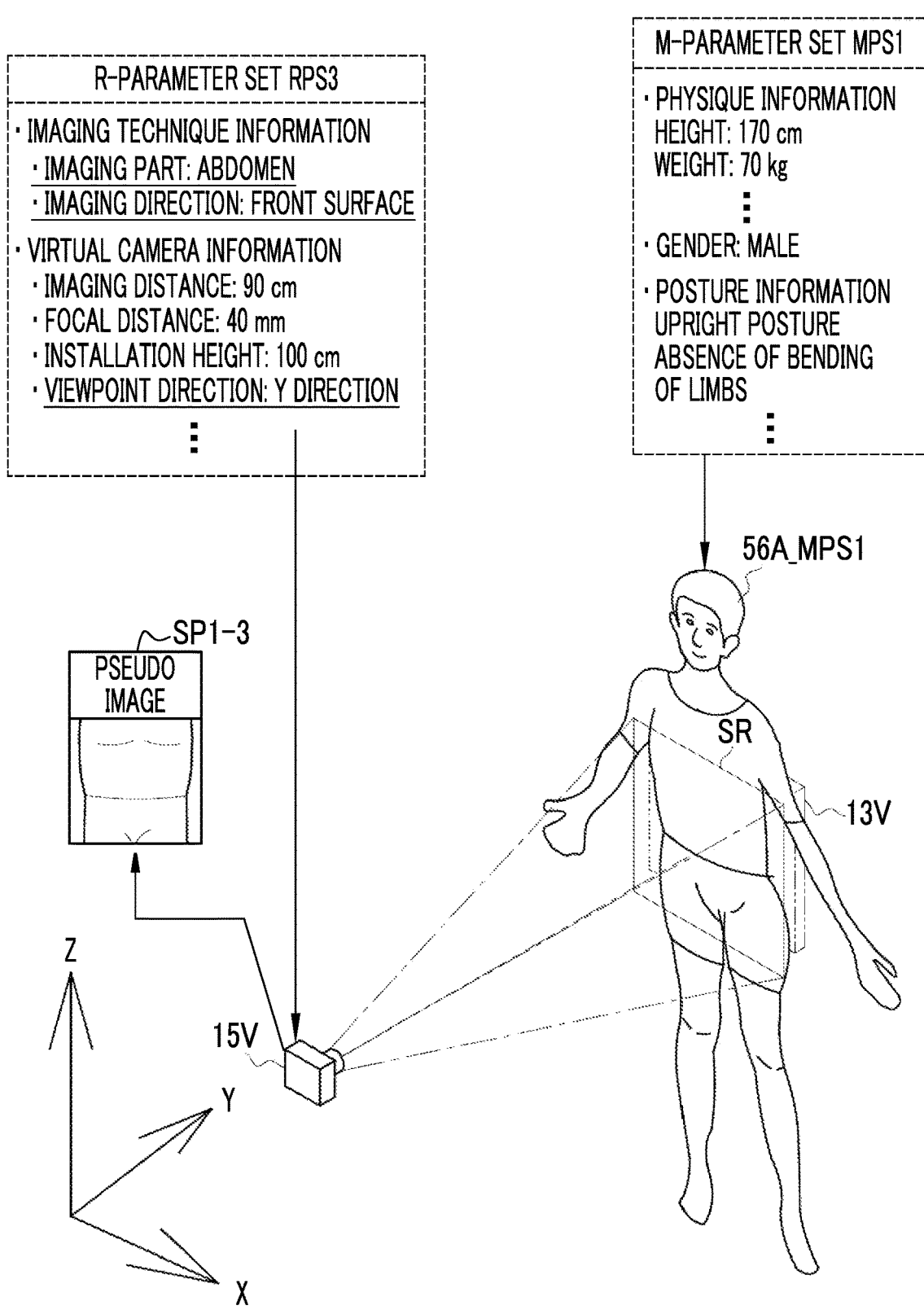
FIG. 12 is a diagram showing an example of the pseudo image.

FIG. 12 shows an example in which the pseudo image SP in which the imaging technique is "abdomen/front surface" is generated. The M-parameter set MPS1 of FIG. 12 is the same as the example of FIGS. 10 and 11, and the human body model 56A_MPS1 is the same as the example of FIGS. 10 and 11. Unlike the R-parameter set RPS1 of FIG. 10, in an R-parameter set RPS3 of FIG. 12, the imaging part is changed from "chest" to "abdomen". The imaging direction is "front surface", which is different from "back surface" in FIG. 10, but is the same as the example in FIG. 11. In the R-parameter set RPS3 of FIG. 12, other points are the same as those of the R-parameter set RPS2 of FIG. 11.

Based on such an R-parameter set RPS3, the position or the like of the virtual camera 15V is set, and the rendering of the human body model 56A_MPS1 is executed. As a result, a pseudo image SP1-3 corresponding to the imaging technique of the "chest/front surface" of the human body model 56A_MPS1 is generated.

FIG. 13 shows an example in which the pseudo image SP in which the imaging technique is "both knees/front surface" is generated. Unlike the examples of FIGS. 10 to 13, in the M-parameter set MPS2 of FIG. 13, "sitting posture" and "presence of bending of both knees" are designated as the posture information. As a result, a human body model 56A_MPS2 is modeled in a posture in which both knees are bent in the sitting posture. In an R-parameter set RPS4 of FIG. 13, in the imaging technique information, "both knees" are designated as the imaging part, and "front surface" is designated as the imaging direction. In the virtual camera information, the installation height of 150 cm is designated as a height at which both knees of the human body model 56A_MPS2 in the sitting posture can be imaged from the front surface, and a down direction in the Z direction, that is, "−Z direction" is designated as the imaging direction.

Based on such an R-parameter set RPS4, the position or the like of the virtual camera 15V is set, and the rendering of the human body model 56A_MPS2 is executed. As a result, a pseudo image SP2-4 corresponding to the imaging technique of "both knees/front surface" of the human body model 56A_MPS2 is generated.

FIG. 14 shows an example in which the pseudo image SP in which the imaging technique is "chest/front surface" is generated, similarly to FIG. 11. In the example of FIG. 14, the R-parameter set RPS2 is the same as the example of FIG. 11. The difference is the physique information of an M-parameter set MPS4 of FIG. 14, and the values of the chest circumference, the waist circumference, and the like, which are not shown, are larger than those of the M parameter set MPS1 of FIG. 11. That is, a human body model 56A_MPS4 modeled based on the M-parameter set MPS4 of FIG. 14 is fatter than the human body model 56A_MPS1 of FIG. 11. Other points are the same as the example of FIG. 11. As a result, a pseudo image SP4-2 corresponding to the "chest/front surface" imaging technique is generated for the human body model 56A_MPS4 having a fat physique.

FIG. 15 shows an example in which the pseudo image SP in which the imaging technique is "both knees/front surface" is generated, similarly to FIG. 13. The difference from the example of FIG. 13 is that the skin color is designated as brown in an M-parameter set MPS5. Other points are the same as the example of FIG. 13. As a result, a pseudo image SP5-4 of "both knees/front surface" is generated for a human body model 56A_MPS5 having a brown skin color.

The teacher data generation unit 51 generates the plurality of pseudo images SP for each combination of the imaging part and the imaging direction based on the parameter designation information 61. For example, the teacher data generation unit 51 generates the plurality of pseudo images SP by using different parameter sets (M-parameter set MPS and R-parameter set RPS) for each imaging technique, such as "chest/front surface" and "chest/back surface".

Hereinafter, the action of the learning device 40 having the configuration described above will be described with reference to the flowcharts shown in FIGS. 16 to 18. As shown in the main flowchart of FIG. 16, the learning device 40 generates the teacher data TD based on the 3DCG data (step S100), and trains the machine learning model LM0 using the generated teacher data TD (step S200).

Figures 16, 17:
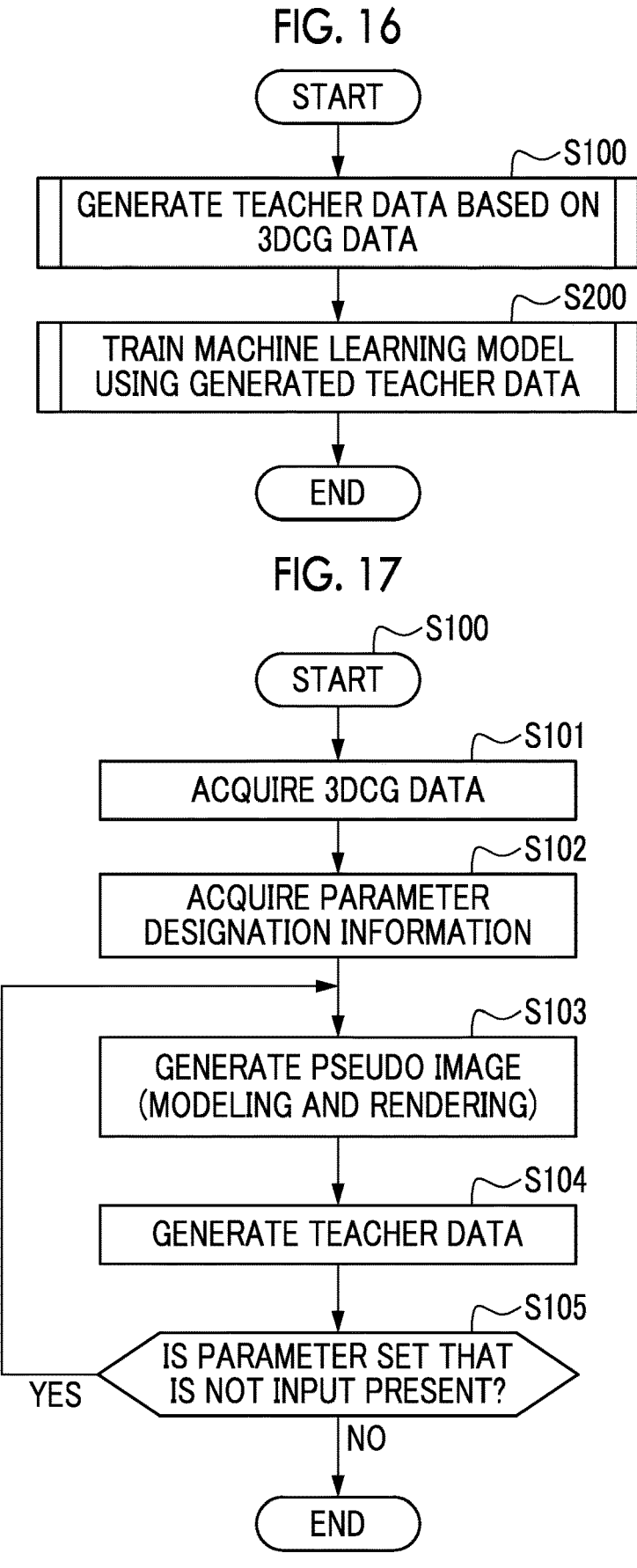
FIG. 16 is a main flowchart showing a processing procedure of the learning device.
FIG. 17 is a flowchart showing a teacher data generation procedure.

FIG. 17 shows details of step S100 of generating the teacher data TD. As shown in FIG. 17, in step S100, first, the teacher data generation unit 51 of the learning device 40 acquires the 3DCG data 56 (step S101). Then, the teacher data generation unit 51 acquires the parameter designation information 61. In the present example, in step S101 and step S102, the teacher data generation unit 51 reads out the 3DCG data 56 and the parameter designation information 61 stored in the storage device 46.

For example, the plurality of M-parameter sets MPS and the plurality of R-parameter sets RPS are recorded in the parameter designation information 61. As shown in FIGS. 10 to 15, the teacher data generation unit 51 executes the modeling and the rendering for each combination of one M-parameter set MPS and one R-parameter set RPS to generate one pseudo image SP (step S103). The teacher data generation unit 51 generates the teacher data TD by combining the generated pseudo image SP and the correct answer data AD (step S104). The generated teacher data TD is stored in the storage device 46.

In step S105, in a case in which there is a parameter set that is not input in the parameter set (combination of the M-parameter set MPS and the R-parameter set RPS) included in the acquired parameter designation information 61 (YES in step S105), the teacher data generation unit 51 executes processing of step S103 and step S104. The teacher data generation unit 51 generates the plurality of pseudo images SP by using different parameter sets (M-parameter set MPS and R-parameter set RPS) for each imaging technique, such as "chest/front surface" and "chest/back surface". In a case in which there is no parameter set that is not input (NO in step S105), the teacher data generation processing is terminated.

Figure 18:
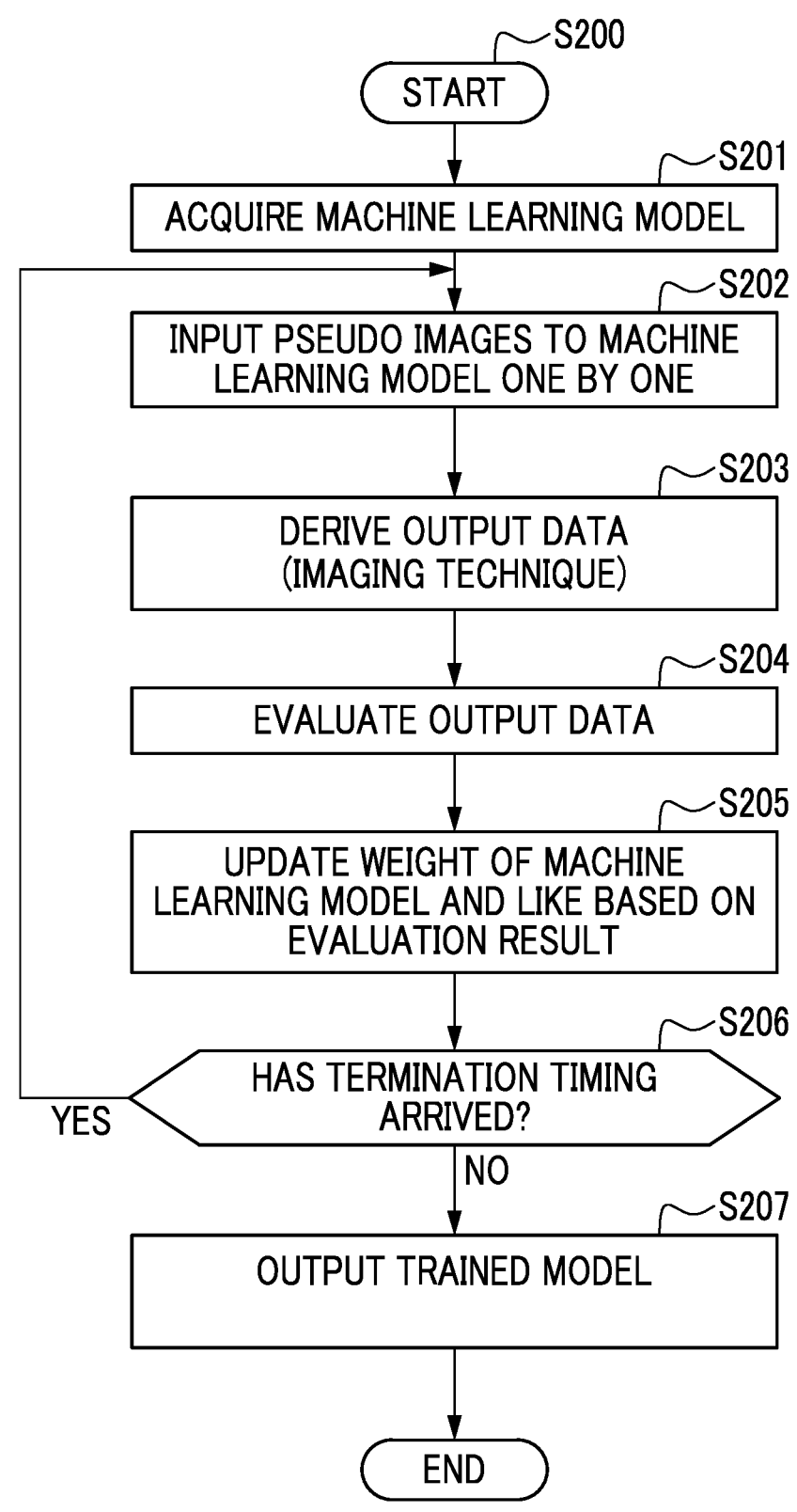
FIG. 18 is a flowchart showing a training procedure.

FIG. 18 shows details of step S200 of training the machine learning model LM0 using the generated teacher data TD. As shown in FIG. 18, in step S200, first, in the learning unit 52 of the learning device 40, the main processing unit 52A acquires the machine learning model LM0 from the storage device 46 (step S201). Then, the main processing unit 52A acquires the teacher data TD generated by the teacher data generation unit 51 from the storage device 46, and inputs the pseudo images SP included in the teacher data TD into the machine learning model LM0 one by one (step S202). Then, the main processing unit 52A causes the machine learning model LM0 to derive the output data OD including the imaging technique (step S203). Hereinafter, the evaluation unit 52B compares the correct answer data AD with the output data OD to evaluate the output data OD (step S204). The update unit 52C updates values of the filter coefficient and the weight of the perceptron of the machine learning model LM0, and the like based on the evaluation result of the output data OD (step S205).

The learning unit 52 repeats the series of processing from step S202 to step S205 until the termination timing arrives (YES in step S206). In a case in which the termination timing arrives (NO in step S206), such as a case in which all the training of the planned number of teacher data TD is terminated or a case in which the loss falls below the target value, the learning unit 52 terminates the training and outputs the trained model LM (step S207).

As described above, the learning device 40 according to the present embodiment generates the plurality of pseudo images SP, which are the pseudo images SP of the human body generated based on the human body model 56A composed of the 3DCG data and imitate the examination subject H in a state of being positioned with respect to the radiography system 10 as an example of the medical imaging apparatus, for each combination of the imaging part and the imaging direction. Then, the machine learning model LM0 is trained using the plurality of teacher data TD composed of the generated pseudo image SP and the correct answer data AD of the combination. The pseudo image SP that configures the teacher data TD is generated based on the human body model 56A that is composed of the 3DCG data. Therefore, it is easy to increase the number of teacher data TD showing the imaging technique as compared with a case in which the camera image CP showing the imaging technique, which is the combination of the imaging part and the imaging direction, is acquired by the optical camera 15. Therefore, it is possible to efficiently train the trained model LM that derives the imaging part and the imaging direction of the examination subject H shown in the camera image CP as compared with a case in which only the camera image CP is used as the teacher data TD.

In addition, the 3DCG data of the example described above is attached with the M-parameter 56B for changing at least one of the posture or the appearance of the human body model 56A. Therefore, for example, it is possible to generate the plurality of pseudo images SP in which at least one of the posture or the appearance of the human body model 56A is different only by changing the M-parameter 56B using the parameter designation information 61. Therefore, it is easy to generate various pseudo images SP in which at least one of the posture or the appearance of the human body model 56A is different. There is an individual difference also in the actual posture or appearance of the examination subject H. It takes a lot of time and effort to collect the camera images CP of the various examination subjects H or the camera images CP of the examination subjects H in various postures. In view of these circumstances, a method of simply changing the posture or the appearance of the human body model 56A by changing the M-parameter 56B is very effective.

In addition, the M-parameter 56B includes at least one of the physique information, the gender, the posture information, the skin color, the hair color, the hairstyle, or the clothes of the human body model 56A. In the technology of the present disclosure, by making it possible to designate the information on the appearance and the posture information in detail, it is possible to easily collect the image of the human body having the appearance or the posture that is difficult to collect with the actual camera image CP. Therefore, for example, even in a case in which the imaging parts and the imaging directions are the same, the machine learning model LM0 can be trained using the pseudo image SP of the human body model 56A that imitates the examination subject H having a wide variety of appearance as the teacher data TD. Accordingly, it is possible to improve the accuracy of deriving the imaging part and the imaging direction from the camera image CP in the trained model LM as compared with a case in which the physique information or the like cannot be designated.

In the example described above, the description has been made in which the physique information includes the height, the weight, the sitting height, the inseam length, the head circumference, the neck circumference, the shoulder width, the chest circumference (bust), the waist circumference (waist), the hand length, the wrist circumference, the hand width, the foot length, the foot width, the thigh circumference, the calf circumference, and the like, but the physique information need only include at least one thereof. Of course, it is preferable that the number of items of the physique information is larger because the variety of the human body model 56A can be ensured. In addition, although the example has been made in which the physique information is defined by the height, the weight, and the like with numerical values, evaluation information, such as skinny, standard, and fat, may be used in addition to the numerical values.

In addition, in the present embodiment, the rendering unit 51B can generate the pseudo image SP by rendering the human body model 56A from the set viewpoint, and the viewpoint can be changed by the R-parameter set RPS that defines the rendering parameter. Therefore, the viewpoint can be easily changed and various pseudo images SP can be easily generated as compared with a case in which such the rendering parameter is not provided.

The viewpoint information for setting the viewpoint includes the focal length of the virtual camera 15V, which is virtually installed at the viewpoint, and the imaging distance, which is the distance from the virtual camera 15V to the human body model 56A. Since the imaging distance and the focal length can be changed, it is easy to change the imaging range SR of the virtual camera 15V.

In the embodiment described above, the example has been described in which the technology of the present disclosure is applied to the radiography system 10 which is an example of the medical imaging apparatus and the radiography apparatus. In the radiography, there are many types of imaging orders for designating the combination of the imaging part and the imaging direction, such as "chest/front surface", "abdomen/front surface", and "both knees/front surface". The present disclosure is particularly effective in a case in which the present disclosure is used in the medical imaging apparatus having many types of imaging orders as described above.

In the example described above, batch processing of continuously generating the plurality of pseudo images SP may be executed using the parameter designation information 61 shown in FIG. 9. The parameter designation information 91 includes the M-parameter designation information 61M and the R-parameter designation information 61R. Moreover, as shown in FIG. 9, the plurality of M-parameter sets MPS can be designated for the M-parameter designation information 61M, and the plurality of R-parameter sets RPS can be designated for the R-parameter designation information 61R. By designating a combination of the M-parameter set MPS and the R-parameter set RPS, one pseudo image SP is generated. Therefore, by using the parameter designation information 91, it is possible to execute the batch processing of continuously generating the plurality of pseudo images SP. In a case in which the pseudo image SP is generated using the 3DCG data 56, such batch processing can be executed. By executing the batch processing, it is possible to efficiently generate the plurality of pseudo images SP.

In addition, in the example described above, although the example has been described in which the optical camera 15 captures the still image, the moving image may be captured. In a case in which the optical camera 15 is caused to capture the moving image, the technician RG may input the imaging instruction before the positioning of the examination subject H is started, to cause the optical camera 15 to start to capture the moving image, and to transmit the moving image captured by the optical camera 15 to the console 14 in real time. In this case, for example, a frame image configuring the moving image is used as the input data for the trained model LM.

Modification Example 1

Figure 19:
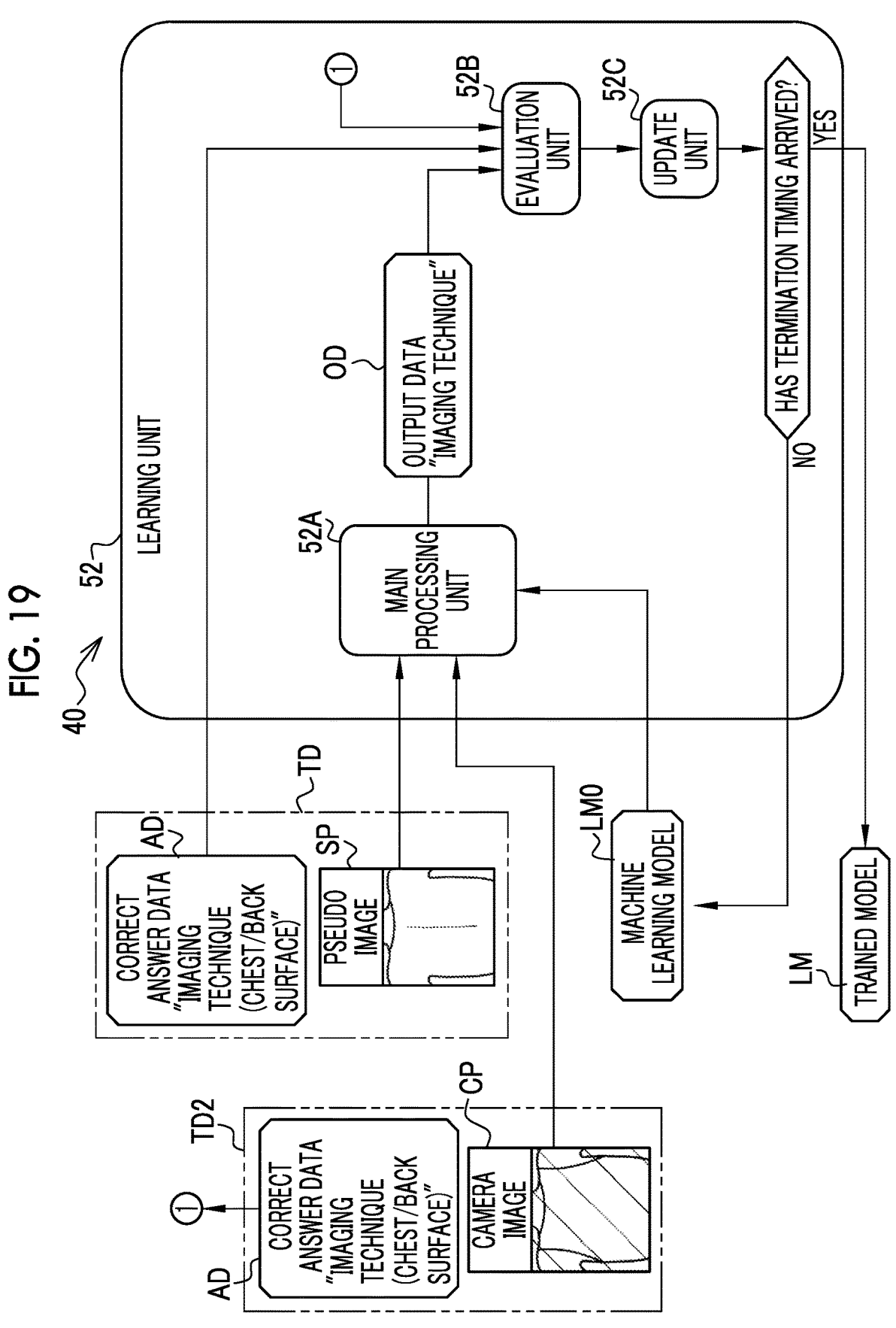
FIG. 19 is a diagram showing a modification example in which the pseudo image and a camera image are mixed as teacher data.

In the example described above, the example has been described in which only the pseudo image SP is used as the teacher data TD. However, as shown in FIG. 19, the camera image CP may be mixed in addition to the pseudo image SP to train the machine learning model LM0. Here, in a case in which the teacher data TD composed of the pseudo image SP and the correct answer data AD is defined as first teacher data, the teacher data composed of the camera image CP and the correct answer data AD is defined as second teacher data TD2. The learning unit 52 trains the machine learning model LM0 using both the first teacher data TD and the second teacher data TD2. By executing training using the camera image CP used in the operation of the trained model LM, the accuracy of deriving the imaging part and the imaging direction is improved as compared with a case in which only the pseudo image SP is used.

Modification Example 2

Figure 20:
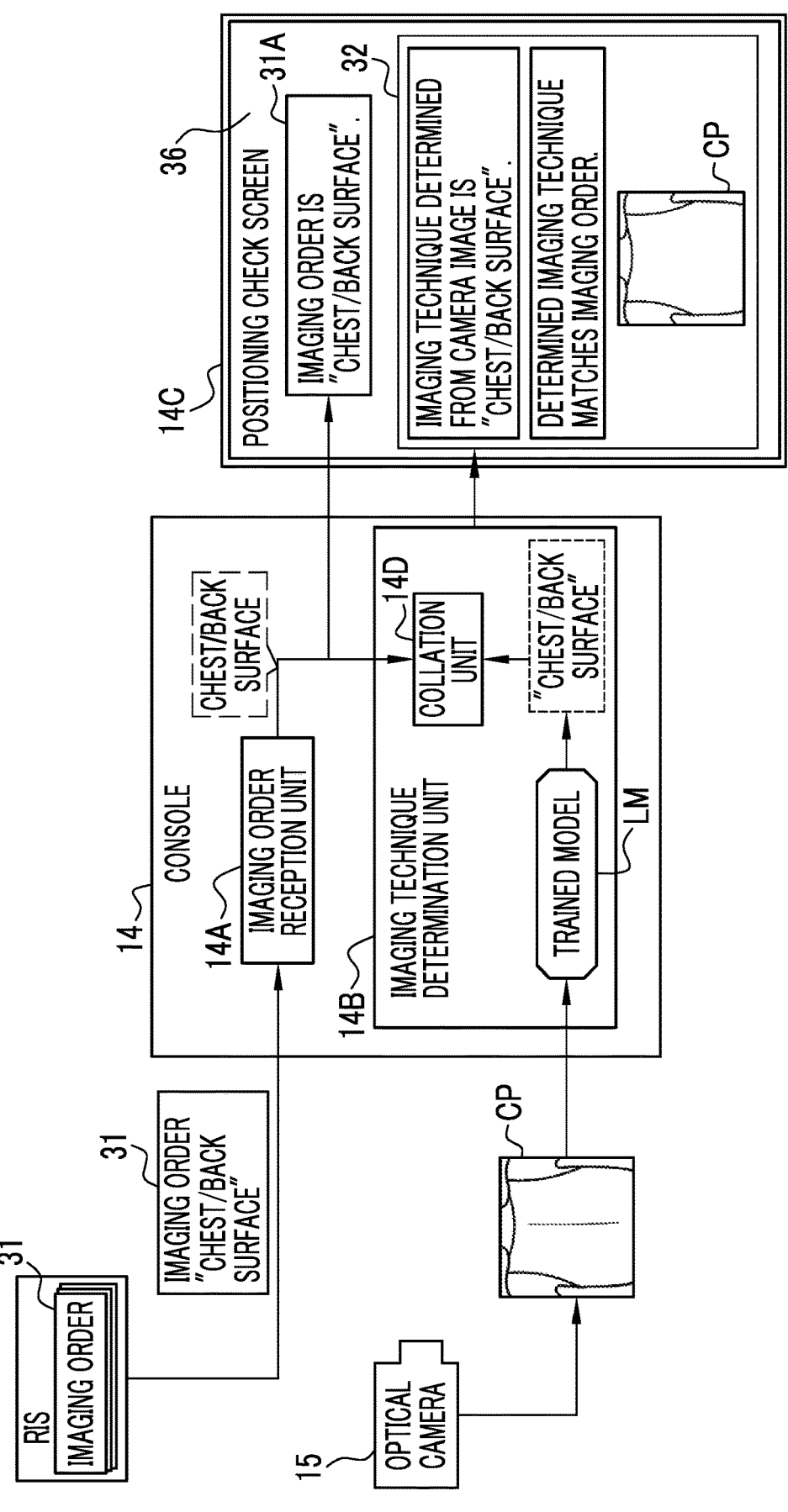
FIG. 20 is a diagram showing a modification example in which a collation unit is added.

In the example described above, as shown in FIG. 4, in an operation phase of the trained model LM, the imaging technique determination unit 14B outputs, to the display 14C, the imaging technique ("chest/back surface" or the like) included in the imaging order 31 and the imaging technique ("chest/back surface" or the like) derived by the trained model LM as they are. However, as shown in FIG. 20, a collation unit 14D may be provided in the imaging technique determination unit 14B so that the collation unit 14D collates the imaging technique included in the imaging order 31 with the imaging technique derived by the trained model LM. In this case, the collation unit 14D may output a collation result of whether or not the two imaging techniques match and display the collation result on the positioning check screen 36. In the example of FIG. 20, the collation result is displayed in a form of a message, such as "The determined imaging technique matches the imaging order". In addition, in a case in which the collation result is a collation result that the two imaging techniques do not match, a message (not shown), such as "The determined imaging technique does not match the imaging order" is displayed as the collation result on the positioning check screen 36. Such a message functions as an alert to the technician RG to be aware of a positioning mistake. Further, a voice, a warning sound, a warning lamp, or the like may be used as the alert.

In the embodiment described above, the learning device 40 includes the teacher data generation unit 51, and the learning device 40 also functions as the teacher data generation device. However, the teacher data generation unit 51 may be separated from the learning device 40 and used as an independent device.

Second Embodiment

Figure 21:
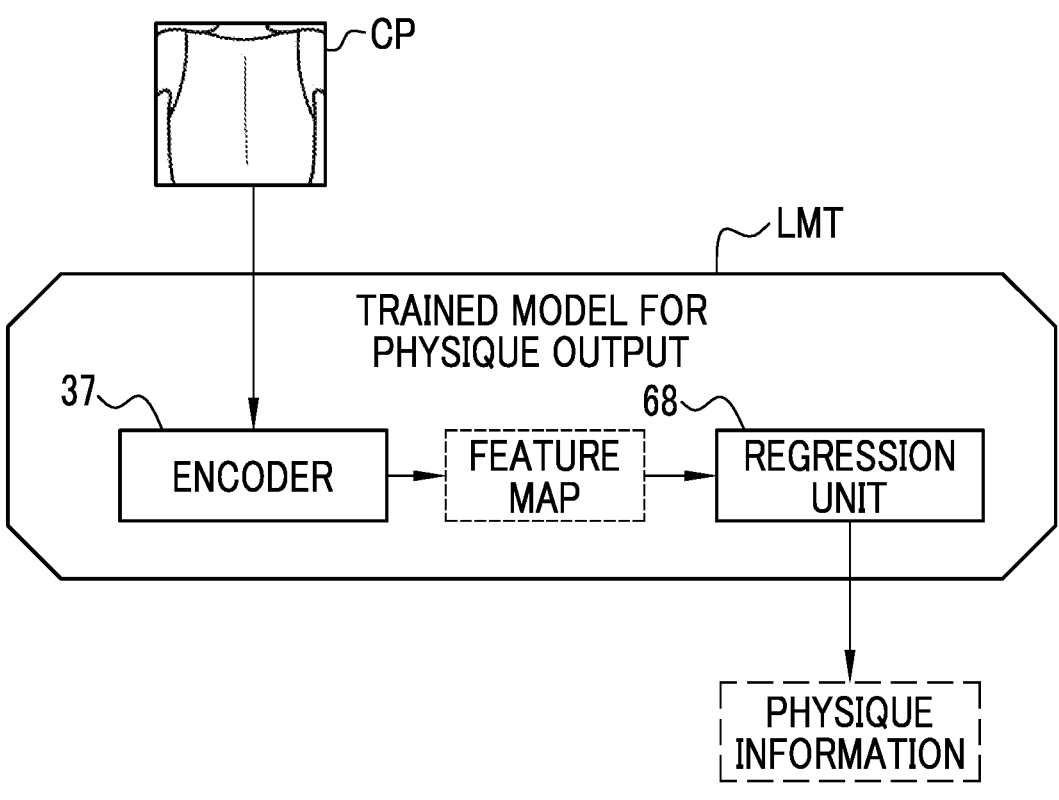
FIG. 21 is a diagram for describing a trained model for physique output.
Figure 22:
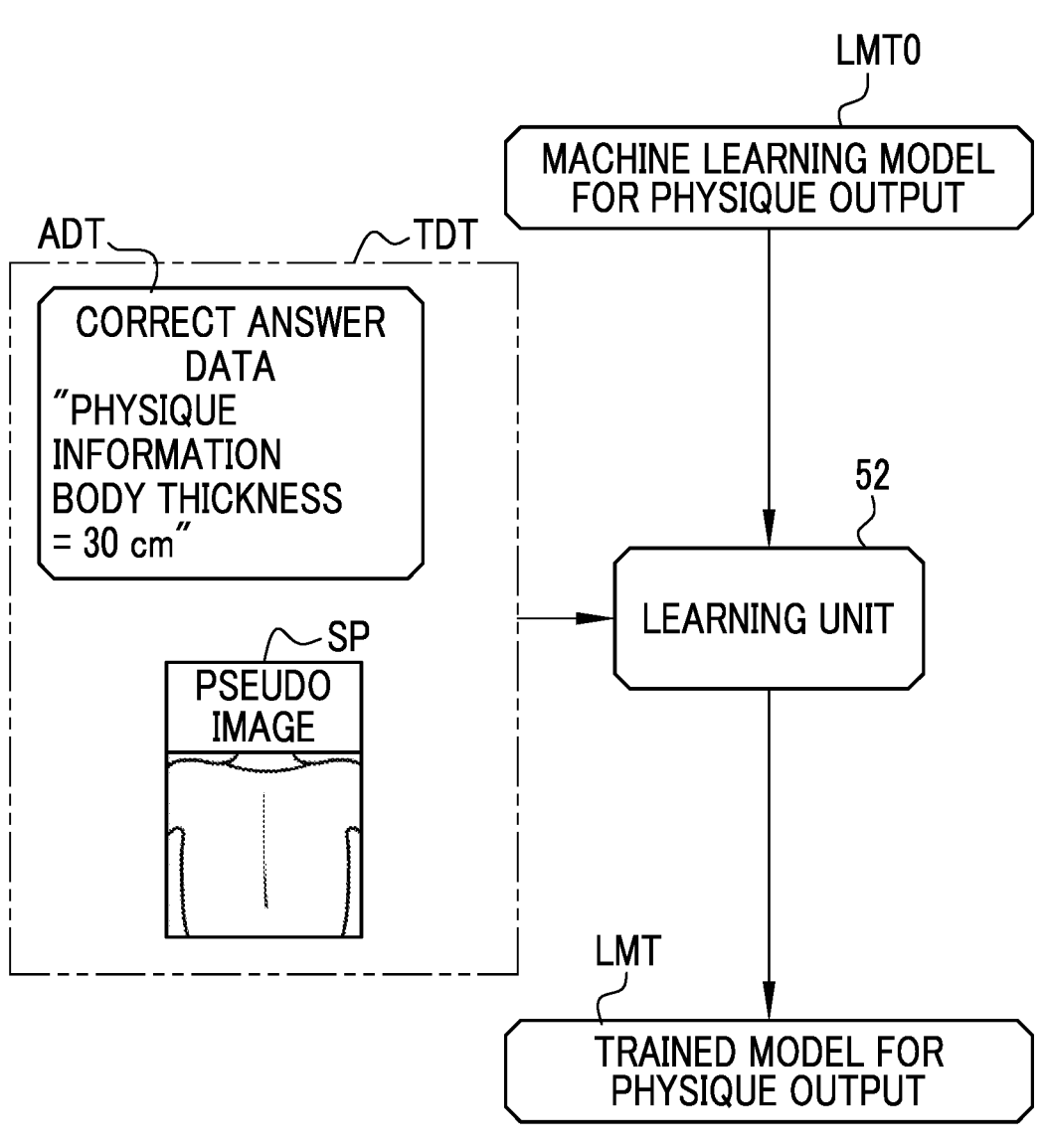
FIG. 22 is a diagram for describing teacher data used to train a machine learning model for physique output.

In the second embodiment shown in FIG. 21 and FIG. 22, a trained model for physique output LMT that uses the camera image CP as an input and derives the physique information indicating the physique of the examination subject H shown in the camera image CP will be considered. The second embodiment is an example in which the pseudo image SP is used to train a machine learning model for physique output LMTO, which is the base of the trained model for physique output LMT, in order to generate such a trained model for physique output LMT. As shown in FIG. 21, the trained model for physique output LMT comprises, for example, the encoder 37 and a regression unit 68. The encoder 37 is the same as the trained model LM that derives the imaging technique shown in FIG. 5. The trained model for physique output LMT is the regression model that estimates, for example, a numerical value of the body thickness as the physique information of the examination subject H shown in the camera image CP from the feature map of the camera image CP. For example, a linear regression model, a support vector machine, or the like is used as the regression unit 68.

As shown in FIG. 22, the learning unit 52 trains the machine learning model for physique output LMTO using a plurality of teacher data for physique output TDT using the pseudo image SP. The teacher data for physique output TDT is composed of the pseudo image SP and correct answer data ADT of the physique information indicating the physique of the human body model 56A.

As shown in FIG. 3, the body thickness of the examination subject H is used as basic information in a case of the decision of the irradiation condition. Therefore, in a case in which the body thickness can be derived from the camera image CP, the convenience in the radiography is improved.

Third Embodiment

Figure 23:
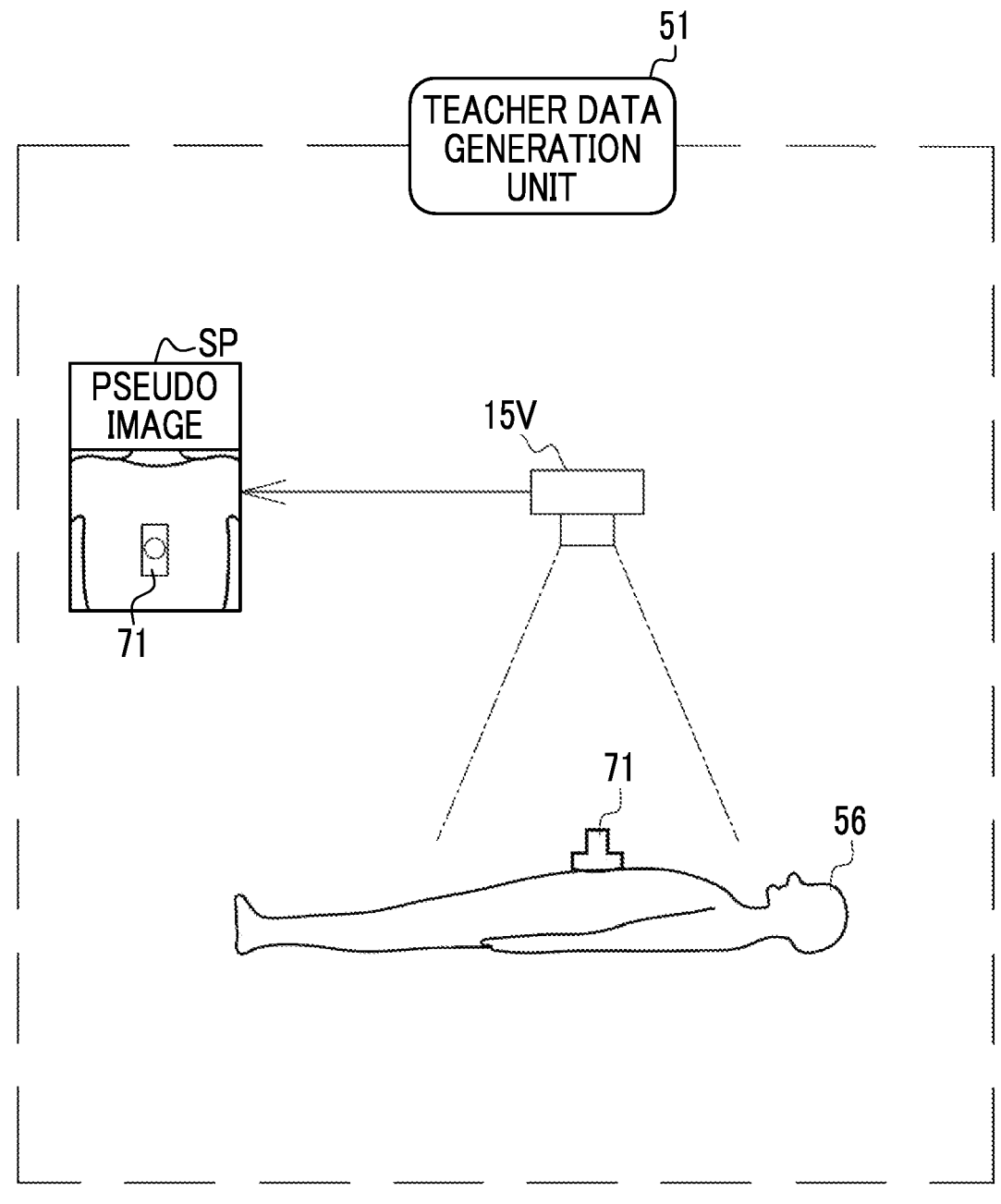
FIG. 23 is a diagram for describing a teacher data generation unit applied to an ultrasound imaging apparatus.

The third embodiment shown in FIG. 23 is an example in which the technology of the present disclosure is applied to an ultrasound imaging apparatus as the medical imaging apparatus. The ultrasound imaging apparatus includes a probe 71 comprising a transmission unit and a reception unit of ultrasound waves. Ultrasound imaging is performed by bringing the probe 71 into contact with the imaging part of the examination subject H. Also in the ultrasound imaging, the imaging part is designated by the imaging order, and the imaging direction (direction of the probe 71) may also be determined according to the imaging purpose. In a case in which the imaging part and the imaging direction are inappropriate, it may not be possible to acquire an appropriate ultrasound image.

In particular, unlike the radiography, the ultrasound imaging can be performed by a nurse or a caregiver in addition to the doctor. In the future, it is also expected that the examination subject H, who is unfamiliar with the imaging, will operate the probe 71 to perform the ultrasound imaging. In this case, it is also studied to use the camera image CP for the imaging guidance. In such a case, it is considered that the trained model LM that uses the camera image CP as an input and derives the imaging part and the imaging direction will be used in many situations. That is, in the ultrasound imaging, the camera image CP is an image obtained by imaging, using the optical camera 15, a state in which the probe 71 is brought into contact with the imaging part of the examination subject H, that is, a state of the examination subject H positioned with respect to the probe 71. As the accuracy of deriving the trained model LM, it is important to train the trained model LM using a wide variety of teacher data TD in order to secure the accuracy that can fit for the use of the imaging guidance. By using the technology of the present disclosure, it is possible to efficiently execute the training using the teacher data TD of a wide variety of pseudo images SP.

As shown in FIG. 23, even in a case in which the technology of the present disclosure is used for the ultrasound imaging, the teacher data generation unit 51 generates the pseudo image SP by rendering a state in which the human body model 56A is positioned with respect to a virtual probe 71, from the viewpoint set by the virtual camera 15V. As shown in FIG. 7, the machine learning model LM is trained using the teacher data TD of the generated pseudo image SP.

In each of the embodiments described above, for example, a hardware structure of a processing unit that executes various types of processing, such as the teacher data generation unit 51 and the learning unit 52, is various processors as described below.

A CPU, a programmable logic device (PLD), a dedicated electric circuit, and the like are included in various processors. The CPU is a general-purpose processor that executes software (program) and functions as various processing units, as is well known. The PLD is a processor of which a circuit configuration can be changed after manufacturing, such as a field programmable gate array (FPGA). The dedicated electric circuit is a processor having a circuit configuration specially designed for executing specific processing, such as an application specific integrated circuit (ASIC).

One processing unit may be configured by one of these various processors, or may be configured by a combination of two or more same type or different types of processors (for example, a plurality of FPGAs, or a combination of a CPU and an FPGA). In addition, a plurality of the processing units may be configured by one processor.

As an example in which a plurality of processing units are configured by one processor, first, there is a form in which one processor is configured by a combination of one or more CPUs and the software, and the processor functions as a plurality of processing units. Second, there is a form in which a processor, which realizes the functions of the entire system including the plurality of processing units with one IC chip, is used, as represented by a system on chip (SoC) or the like. As described above, various processing units are configured by one or more of the various processors described above, as the hardware structure.

Further, the hardware structures of these various processors are, more specifically, an electric circuit (circuitry) in which circuit elements such as semiconductor elements are combined.

It is needless to say that the technology of the present disclosure is not limited to each of the embodiments described above, various configurations can be adopted as long as the configuration does not deviate from the gist of the technology of the present disclosure. Further, the technology of the present disclosure extends to a computer-readable storage medium that non-transitorily stores the program, in addition to the program.

The contents described and shown above are detailed descriptions of portions according to the technology of the present disclosure and are merely examples of the technology of the present disclosure. For example, the above description of the configurations, functions, actions, and effects is a description of an example of the configurations, functions, actions, and effects of the portions according to the technology of the present disclosure. Accordingly, it goes without saying that unnecessary portions may be deleted, new elements may be added, or replacement may be made with respect to the contents described and shown above without departing from the scope of the technology of the present disclosure. In addition, in order to avoid complication and facilitate understanding of portions according to the technology of the present disclosure, description related to common technical knowledge or the like that does not need to be particularly described for enabling implementation of the technology of the present disclosure is omitted in the contents described and shown above.

What is claimed is:

1. A learning device that trains a machine learning model that uses, as input, a camera image obtained by imaging an examination subject in a state of being positioned with respect to a medical imaging apparatus with an optical camera, and derives an imaging part and an imaging direction of the examination subject shown in the camera image, the learning device comprising:
a processor; and
a memory connected to or built in the processor,
wherein the processor
generates a plurality of pseudo images, which are pseudo images of a human body generated based on a human body model composed of three-dimensional computer graphics data and imitate the examination subject in a state of being positioned with respect to the medical imaging apparatus, for each imaging technique that is information specified for an examination and that is defined by a combination of the imaging part and the imaging direction, and
trains the machine learning model using a plurality of teacher data composed of the generated pseudo image and correct answer data of the imaging technique.

2. The learning device according to claim 1,
wherein the three-dimensional computer graphics data is attached with a modeling parameter for changing at least one of a posture or appearance of the human body model.

3. The learning device according to claim 2,
wherein the modeling parameter includes at least one of physique information indicating a physique of the human body model, gender, posture information, a skin color, a hair color, a hairstyle, or clothes.

4. The learning device according to claim 1,
wherein the processor is able to generate the pseudo image by rendering the human body model from a set viewpoint, and the viewpoint is changeable by a rendering parameter.

5. The learning device according to claim 4,
wherein viewpoint information for setting the viewpoint includes a focal length of a virtual camera, which is virtually installed at the viewpoint, and an imaging distance, which is a distance from the virtual camera to the human body model.

6. The learning device according to claim 1,
wherein, in a case in which the teacher data composed of the pseudo image and the correct answer data is defined as first teacher data,
the processor trains the machine learning model using second teacher data composed of the camera image captured by the optical camera and the correct answer data in addition to the first teacher data.

7. The learning device according to claim 1,
wherein a machine learning model for physique output that uses the camera image as input and derives physique information indicating a physique of the examination subject is further trained using a plurality of teacher data for physique output composed of the pseudo image and correct answer data of physique information indicating a physique of the human body model.

8. The learning device according to claim 1,
wherein the medical imaging apparatus includes at least one of a radiography apparatus or an ultrasound imaging apparatus.

9. A learning method of training, via a computer, a machine learning model that uses, as input, a camera image obtained by imaging an examination subject in a state of being positioned with respect to a medical imaging apparatus with an optical camera, and derives an imaging part and an imaging direction of the examination subject shown in the camera image, wherein a combination of the imaging part and the imaging direction is an imaging technique that is information specified for an examination, the learning method comprising:
generating a plurality of pseudo images, which are pseudo images of a human body generated based on a human body model composed of three-dimensional computer graphics data and imitate the examination subject in a state of being positioned with respect to the medical imaging apparatus, for each imaging technique; and
training the machine learning model using a plurality of teacher data composed of the generated pseudo image and correct answer data of the imaging technique.

10. A non-transitory computer-readable storage medium storing an operation program of a learning device, the operation program causing a computer to function as a learning device that trains a machine learning model that uses, as input, a camera image obtained by imaging an examination subject in a state of being positioned with respect to a medical imaging apparatus with an optical camera, and derives an imaging part and an imaging direction of the examination subject shown in the camera image, wherein a combination of the imaging part and the imaging direction is an imaging technique that is information specified for an examination, the operation program causing the computer to function as the learning device that
generates a plurality of pseudo images, which are pseudo images of a human body generated based on a human body model composed of three-dimensional computer graphics data and imitate the examination subject in a state of being positioned with respect to the medical imaging apparatus, for each imaging technique, and
trains the machine learning model using a plurality of teacher data composed of the generated pseudo image and correct answer data of the imaging technique.

11. A teacher data generation device that generates teacher data used to train a machine learning model that uses, as input, a camera image obtained by imaging an examination subject in a state of being positioned with respect to a medical imaging apparatus with an optical camera, and derives an imaging part and an imaging direction of the examination subject shown in the camera image, the teacher data generation device comprising:
a processor; and
a memory connected to or built in the processor, wherein a combination of the imaging part and the imaging direction is an imaging technique that is information specified for an examination, and wherein the processor uses three-dimensional computer graphics data that configures a human body model for generating a pseudo image of a human body and is attached with a parameter for changing at least one of a posture or appearance of the human body model, generates a plurality of the pseudo images in which at least one of the posture or the appearance of the human body model is different by changing the parameter, for each imaging technique, and generates a plurality of teacher data composed of the generated plurality of pseudo images and correct answer data of the imaging technique.

12. A non-transitory computer-readable storage medium storing a machine learning model that uses, as input, a camera image obtained by imaging an examination subject in a state of being positioned with respect to a medical imaging apparatus with an optical camera, and derives an imaging part and an imaging direction of the examination subject shown in the camera image, wherein a combination of the imaging part and the imaging direction is an imaging technique that is information specified for an examination, wherein the machine learning model is trained using a plurality of teacher data that are composed of a pseudo image, which is a pseudo image of a human body generated based on a human body model composed of three-dimensional computer graphics data and imitates the examination subject in a state of being positioned with respect to the medical imaging apparatus, and correct answer data of the imaging technique, the plurality of teacher data being generated for each imaging technique.

13. A medical imaging apparatus comprising:

the non-transitory computer-readable storage medium storing the machine learning model according to claim 12.

\*  \*  \*  \*  \*